US012207722B2

(12) United States Patent
Kamitani et al.

(10) Patent No.: US 12,207,722 B2
(45) Date of Patent: Jan. 28, 2025

(54) APPLICATOR

(71) Applicant: MITSUBISHI PENCIL COMPANY, LIMITED, Tokyo (JP)

(72) Inventors: Toshimi Kamitani, Tokyo (JP); Kei Oomoto, Tokyo (JP); Akihiro Nakada, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/401,841

(22) Filed: Jan. 2, 2024

(65) Prior Publication Data

US 2024/0237806 A1 Jul. 18, 2024

(30) Foreign Application Priority Data

Jan. 18, 2023 (JP) ................................ 2023-006205

(51) Int. Cl.
*A45D 34/04* (2006.01)
*A61J 1/14* (2023.01)

(52) U.S. Cl.
CPC ............ *A45D 34/04* (2013.01); *A61J 1/1418* (2015.05); *A45D 2200/1018* (2013.01)

(58) Field of Classification Search
CPC ........ B43K 5/1845; B43K 8/04; B65D 47/42; B65D 47/248
USPC .......................................................... 401/206
See application file for complete search history.

(56) References Cited

U.S. PATENT DOCUMENTS 3,038,193 A * 6/1962 Harris ..................... A47L 23/05 251/324
6,883,996 B2 * 4/2005 Ishida ...................... B43K 8/04 401/206
7,086,799 B1 * 8/2006 Pappageorge ....... B43K 17/005 401/206
7,658,568 B1 * 2/2010 Armstrong .............. A47L 13/30 401/206
11,298,516 B2 * 4/2022 Kanesaka .......... B65D 83/0033
11,400,017 B2 * 8/2022 Komiyama ............ B65D 1/023
D998,708 S * 9/2023 Puga ............................ D19/162
2011/0210149 A1 * 9/2011 Essebaggers ........ B65D 47/248 222/544

FOREIGN PATENT DOCUMENTS

JP 2002-160755 A 6/2002

* cited by examiner

*Primary Examiner* — David P Angwin
*Assistant Examiner* — Bradley S Oliver
(74) *Attorney, Agent, or Firm* — Oblon, McClelland, Maier & Neustadt, L.L.P.

(57) ABSTRACT

An applicator is provided with a container containing an application liquid, an inner plug arranged to close the mouth of the container and opens the valve against the biasing force of a spring member to allow the application liquid in the container to be discharged, and the application member arranged to cover an application liquid outlet of the inner plug and enable the application to the application surface by exuding the application liquid discharged through the inner plug. The application unit with the inner plug has a liquid flow passage that provides a flow resistance to the application liquid from inside the container to the application unit, and the total pressure loss per 1 $m^3/s$ in the liquid flow passage is equal to or more than $1\times10^7$ Pa·s and less than $1\times10^{10}$ Pa·s or less.

4 Claims, 21 Drawing Sheets

APPLICATOR

TECHNICAL FIELD

The present invention relates to an applicator that exudes an application liquid such as a cosmetic liquid or medicinal solution contained in a container from an application member attached to the mouth of the container.

BACKGROUND ART

Patent Literature 1 (PTL 1) discloses that an applicator in which a liquid such as a cosmetic liquid or medical solution is contained in a container and the liquid is exuded from an application member that is attached to the mouth of a container and has a relatively wide area made of a synthetic resin material in which open-cell pores are formed.

FIG. 21 shows an application unit provided in the applicator disclosed in PTL 1, and the application unit 3 is provided with an inner plug (a valve) 3*b* attached to the mouth of the container, and an application member 7 is disposed to cover the inner plug 3*b*. The inner plug 3*b* is provided with a valve seat member 5 having a valve seat 5*k* having a funnel shape whose inner diameter reduces toward a valve opening 5*a* at the center and valve body member 6 having a cone-shaped valve body 6*c* which closes the valve by closely attaching to the funnel-shaped valve seat 5*k* of the valve seat member 5.

With the inner plug (valve) 3*b* provided in the application unit 3, pressing a valve rod 6*d* of the valve body member 6 protruding from the valve opening 5*a* of the valve seat member 5 through the application member 7 causes the valve body 6*c* to retract from the valve seat 5*k* to open the valve. This allows the liquid in the container (application liquid) to be discharged from the valve opening 5*a* toward the application member 7.

CITATION LIST

Patent Literature

PTL 1: JP-A-2002-160755

SUMMARY OF INVENTION

Technical Problem

According to the inner plug (valve) disclosed in PTL 1, since the valve body face with a coned shape leaves from the valve seat face with a funnel shape in a parallel state, corresponding to the amount of pushing-in (valve stroke) of the valve rod of the valve body member, the pressure loss (flow resistance) of the valve between the valve seat and the valve body changes to an extremely small value at this moment.

Thus, in the applicator disclosed in PTL 1, the flow control of the application liquid by the degree of pushing-on (valve stroke) of the valve rod of the valve member is difficult, in the case particularly low viscosity liquid such as ethanol as the application liquid is stored in the container, a sudden liquid dispense may occur on pressing the valve rod through the application member, whereby it may reduce user's convenience.

The invention aims to provide an applicator that prevents the sudden dispensing of the application liquid on opening the inner plug by providing the liquid flow passage with a gradual change in pressure loss (flow resistance) corresponding to the amount of the pushing-in (valve stroke) of the valve body constituting the inner plug (valve).

Solution to Problem

The applicator to solve the problem described above is characterized in that an applicator includes a container containing an application liquid, an inner plug that is disposed to close the mouth of the container and opens the valve against the biasing force of a spring member to allow the application liquid in the container to be discharged, and an application member, which is disposed to cover the application liquid outlet of the inner plug and to enable the application to the application surface by exuding the application liquid discharged through the inner plug, wherein a liquid flow passage from the inside of the container toward the application member imparting flow resistance to the application liquid is formed at the application unit provided with an inner plug and the total pressure loss per 1 $m^3/s$ of the liquid flow passage is equal to or more than $1\times10^7$ Pa·s and less than $1\times10^{10}$ Pa·s.

In the above case, the liquid flow passage formed in the application unit includes a first flow passage through a fourth flow passage, which are communicated in series; the first flow passage is a flow passage that is formed between the valve seat of the valve seat member forming the application unit and a valve body of the valve body member facing the valve seat, the second flow passage is a flow passage that is formed between a circumferential side surface of a cylinder connected to the peripheral edge of the valve body of the valve body member and an inner circumferential surface of a first annular protrusion formed connected to the peripheral edge of the valve seat, the third flow passage is a flow passage that is formed between the outer circumferential surface of the first annular protrusion and the inner circumferential surface of a third annular protrusion formed concentrically on the outside of the cylinder in the valve body member, and the fourth flow passage is a flow passage formed between the outside of the third annular protrusion of the valve body and the inside of a second annular protrusion formed concentrically on the outside of the first annular protrusion of the valve seat member.

Further, the pressure loss per 1 $m^3/s$ of the respective liquid flow passages 1 through 4, forming the liquid flow passage, is desirably set to the values obtained by the following Eq. 3:

$$\Delta P/R = 32\ \mu L/Sd^2 \qquad \text{Eq. 3,}$$

where ΔP is a pressure loss (Pa), R is a flow rate ($m^3/s$), μ is the viscosity of the application liquid (Pa·s), L is a representative length (m), S is a cross-sectional area of the representative flow passage length ($m^2$), and d is the hydraulic diameter (m).

Further, the cross-sectional area of the flow passage of the liquid flow passage varies by the retraction of the valve body member that faces the valve seat of the valve seat member constituting the application unit, the pressure loss of the liquid flow passage becomes minimal when the valve body retracts most; the pressure loss per 1 $m^3/s$ in this situation is set to equal to or more than $1\times10^7$ Pa·s and less than $1\times10^{10}$ Pa·s.

Advantageous Effects of Invention

The applicator according to the present invention allows to form a liquid flow passage imparting an appropriate flow resistance to the application liquid in the application unit having an inner plug. The liquid flow passages can impart an appropriate flow resistance to the flow passage by constituting the flow passages 1 through 4 communicated in series in the application unit, for example, and prevent sudden dispensing of the application liquid accompanied by the opening of the inner plug (valve).

With this, an applicator allows for prohibiting an excessive flow of the application liquid and preventing the sudden flowing-out from the application member, even when a particularly low-viscosity and low surface tension liquid such as ethanol recited above as an application liquid is used.

BRIEF DESCRIPTION OF DRAWINGS

FIG. 1A is a front view, FIG. 1B is a side view, FIG. 1C is a rear view, FIG. D is a top view, and FIG. 1E is a bottom view.

FIG. 2A is a perspective view viewed from the front along the right side, and FIG. 2B is a perspective view viewed from the right side along the rear side.

FIG. 4A is a perspective view in a state of covered wholely, and FIG. 4B is a perspective view of the applicator where part of the packaging sheet is removed at the cutout.

FIG. 5A is a perspective view viewed from the front side of the application member, FIG. 5B is a cross-sectional view at the center, and FIG. 5C is a perspective view viewed from the rear side.

FIG. 7A is a side view, FIG. 7B is a longitudinal section view, FIG. 7C is a perspective view viewed from the front side, and FIG. 7D is a perspective view viewed from the rear side.

FIG. 8A is a front view, FIG. 8B is a side view, FIG. 8C is a perspective view viewed from the front side, FIG. 8D is a perspective view viewed from the rear side, and FIG. 8E is a cross-sectional view at the center.

FIG. 9A is a perspective view viewed from the front side, FIG. 9B is a perspective view viewed from the rear side, and FIG. 9C is a longitudinal section view at the center.

FIG. 10A is a front view, FIG. 10B is a side view, and FIG. 10C is a longitudinal section view at the center.

FIG. 11A is a rear view, FIG. 11B is a perspective view viewed from the rear side, and FIG. 11C is a cross-sectional view at the center.

FIG. 12A is a perspective view viewed from the front side, FIG. 12B is a cross-sectional view at the center, and FIG. 12C is a perspective view viewed from the rear side.

FIG. 13A is a perspective view viewed from the front side of the application member, FIG. 13B is a cross-sectional view at the center, and FIG. 13C is a perspective view viewed from the rear side.

FIG. 15A is a side view, FIG. 15B is a longitudinal section view, FIG. 15C is a perspective view viewed from the front side, and FIG. 15D is a perspective view viewed from the rear side.

FIG. 16A is a front view, FIG. 16B is a side view, FIG. 16C is a perspective view viewed from the front side, FIG. 16D is a perspective view viewed from the rear side, and FIG. 16E is a cross-sectional view at the center.

FIG. 20A is a cross-sectional view of the valve seat member, and FIG. 20B is a cross-sectional view of the valve body member.

DESCRIPTION OF INVENTION

Figure 1A:
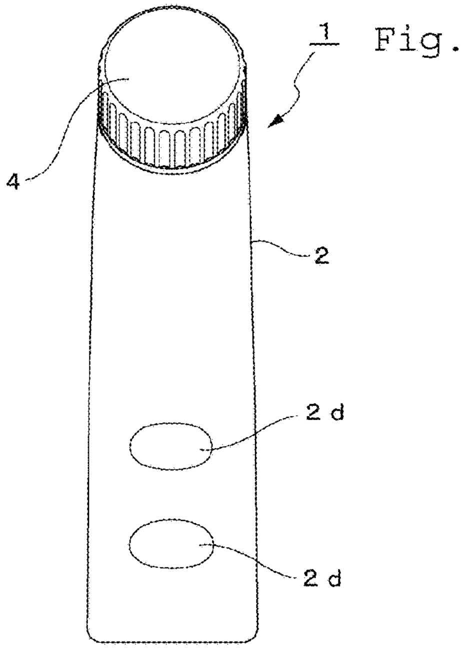
FIGS. 1A through 1E are views showing the appearance constitution of an entire applicator according to the present invention.
Figure 1B:
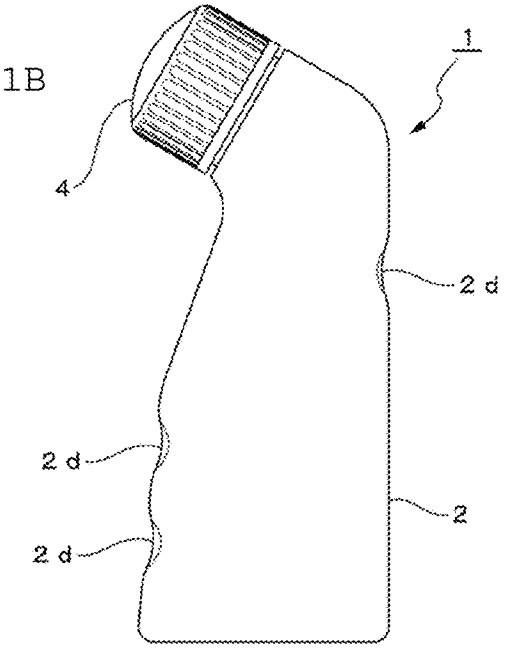
Figure 1C:
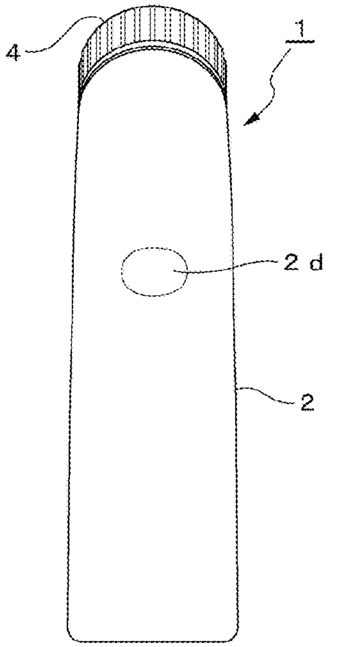
Figure 1D:
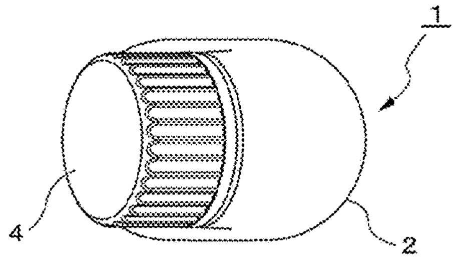
Figure 1E:
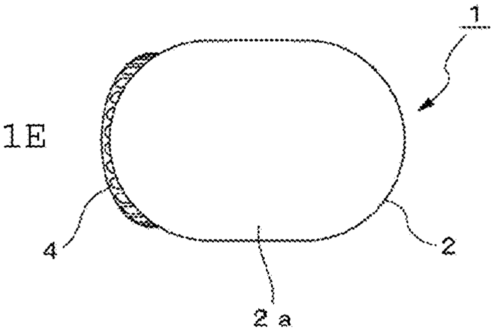

An applicator according to the present invention will be described based on the embodiments shown in the drawings.

Figure 2A:
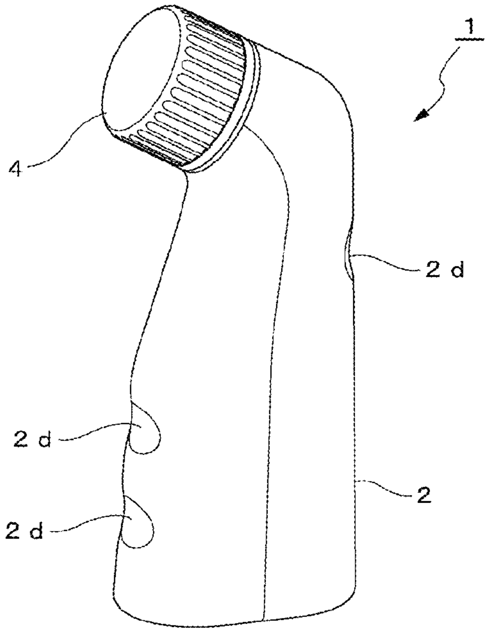
FIGS. 2A and 2B are views showing the appearance constitution of the entire applicator similarly.
Figure 2B:
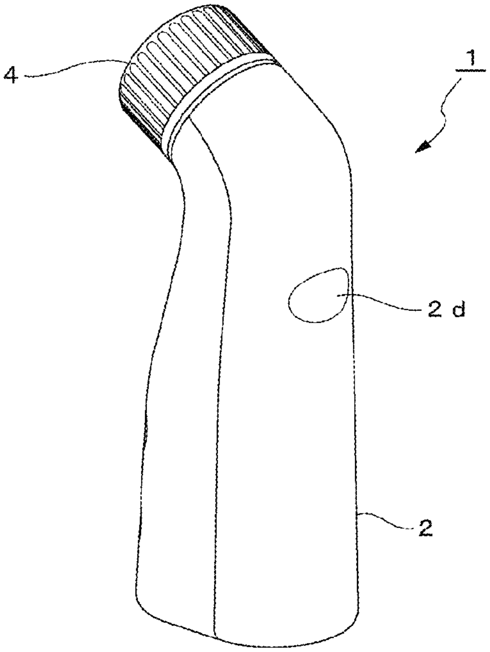
Figure 3:
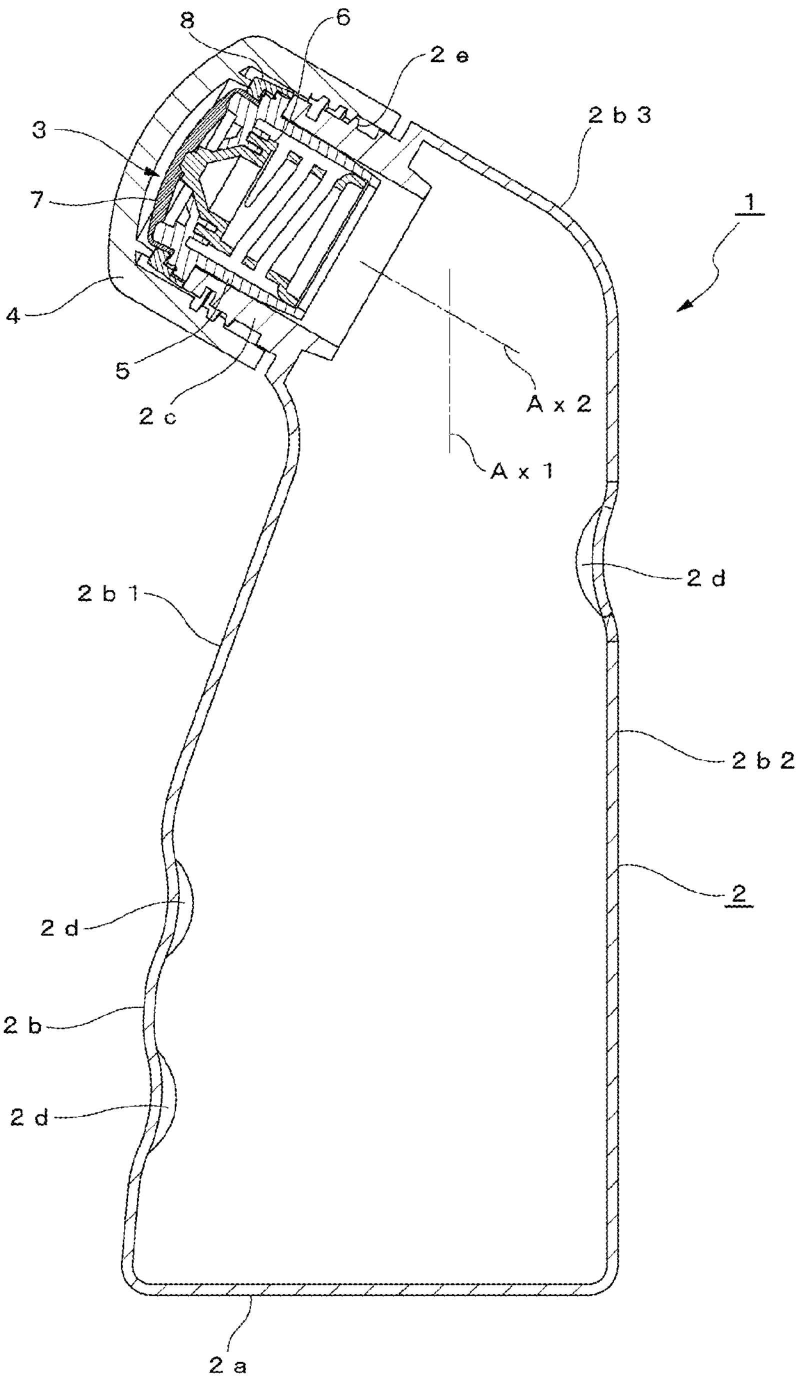
FIG. 3 is an enlarged longitudinal section view of the entire applicator in a state cut at the central part.

FIGS. 1 to 3 show the entire composition of the applicator according to the present invention, and FIG. 3 shows an enlarged cross-sectional view. Thus, the entire composition of the applicator of the present invention will be described based on FIG. 3.

In the following drawings, equivalent portions are indicated by the same referential signs. In some drawings, referential signs are given to representative portions due to limitations of space, and the details of each portion will be described citing the referential signs given to each drawing of single-item composition.

The applicator 1 according to the present invention is provided with a container 2 of bottle-type storing application liquid (not shown) as shown in FIGS. 1 through 3. The container 2 is composed of the bottom 2*a* thereof having an elliptically shaped plate (See FIG. 1E) so as to be mountable on a horizontal plane, and a body portion 2*b* is formed erecting upward continuously to the bottom 2*a*.

The body portion 2*b* has a tilting body portion 2*b*1 composed of a front side erecting face of the container 2, the erecting face on the left side of the container 2 shown in FIG. 3, which reduces the diameter toward the center of the container 2 as rising upward.

The rear side erecting face of the container 2, the erecting face on the right side of the container 2 shown in FIG. 3, composes an upright body portion 2*b*2 approximately orthogonal to the bottom 2*a*.

At the upper portion of the upright body portion 2*b*2, a neck portion 2*b*3 curving toward the front side of the container 2 is formed; a cylindrical mouth 2*c* erecting obliquely upward is integrally formed along the curved face of the neck portion 2*b*3.

The intersection angle that is formed by an axial line Ax1 of the container 2 orthogonal to the face of the bottom 2*a* of the container 2 and an axial line Ax2 of the mouth 2*c* passing the center of the mouth 2*c* is obtuse, and in the example shown in the drawing, the intersection angle of the axial line Ax1 of the container 2 and the axial line Ax2 of the mouth 2*c* is set to approximately 120 degrees.

The mouth 2*c* is configured to be located at a position just above the tilting body portion 2*b*1 whose diameter reduces toward the center of the container 2 as erecting upward, as described before.

With this, the weight balance is considered such that the position of the center of gravity of the whole applicator 1 including an application unit 3 described later to be attached to the mouth 2*c* is prevented from biasing to the front side of the container 2 to which the mouth 2*c* is formed.

In addition, on the front and rear sides of the container 2, multiple finger-hooking recesses 2*d* are formed to which fingers are hooked when the container 2 is held; the finger-hooking recesses 2*d* function to prevent from slipping when the container 2 is held.

The container 2 is preferably formed of flexible synthetic resin, whereby the container 2 is a squeeze bottle capable of being deformed by lightly pressing the right and left side faces of the container 2 such as by hand.

An application member 7 to be described later enabling to exude and apply the application liquid in the container 2 is disposed on the application unit 3 attached to the mouth 2*c* of the container 2 in a state to close the mouth 2. A cap 4 covering the application member 7 is detachably attached using a male thread 2*e* formed on the periphery of the cylinder forming the mouth 2, thereby constituting the applicator 1.

Figure 4B:
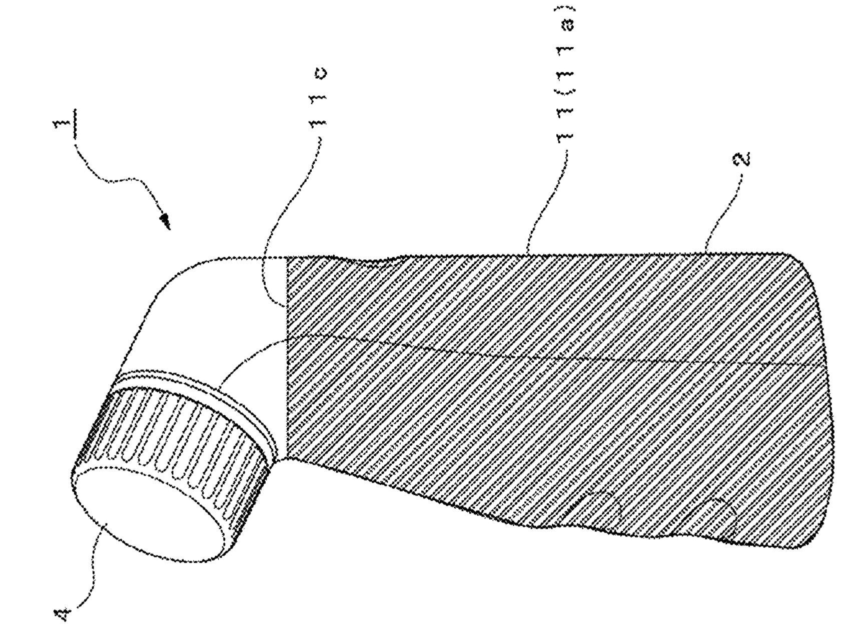
FIGS. 4A and 4B are views showing the appearance constitution of the applicator covered with a packaging sheet.
Figure 4A:
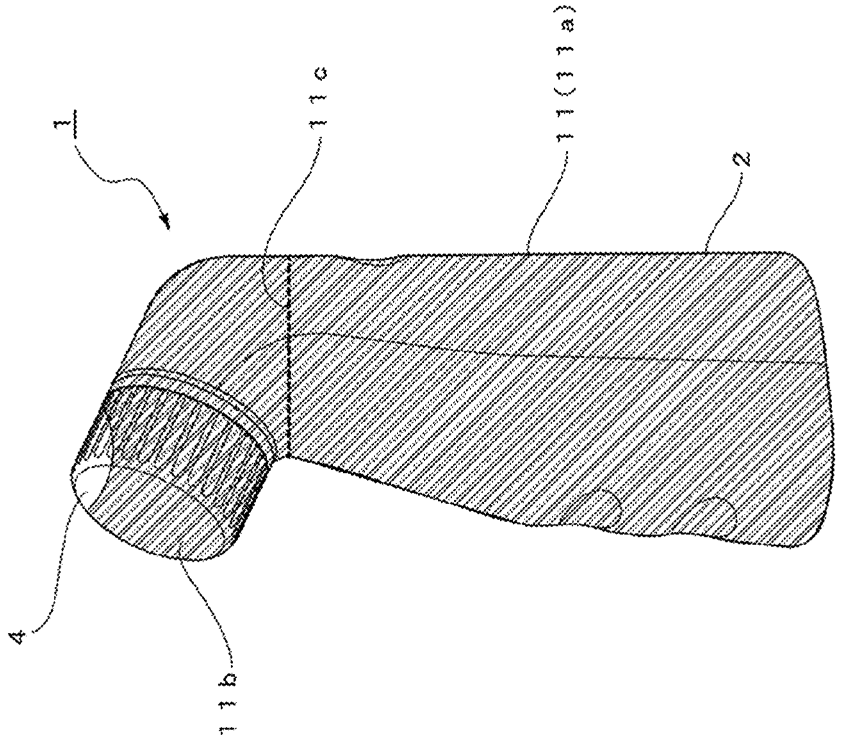

FIGS. 4A and 4B are views showing the appearance constitution of the applicator 1 covered with a packaging sheet 11; in FIGS. 4A and 4B, the packaging sheet 11 is indicated by hatching.

The packaging sheet 11 covers the outer frame of the applicator 1 in a closely contacting state, using a thermo-shrinking type resin sheet formed into a cylindrical shape, for example. FIG. 4A shows the product (applicator 1) in an unused state by covering the entire applicator 1 with a packaging sheet 11. FIG. 4B shows the product (applicator 1) in a usable state by removing the cap-side removing sheet 11*b* from the body-side sheet 11*a*, using a broken-line cut 11*c* formed on the packaging sheet 11.

The broken-line cut 11*c* formed on the packaging sheet 11 is preferably formed in advance on a part of the the thermo-shrinking type resin sheet. Further, in a state where the resin sheet is closely in contact with the container 2 by thermal shrinking, the position of the broken-line cut 11*c* is set to be located parallel to the bottom 2*a* of the container 2 along the smallest cross-sectional part of the container 2 between the body 2*b* and the mouth 2*c* of the container 2 in FIG. 3.

By setting the position of the broken-line cut 11*c* as thus stated, most of the outer frame of the container 2 having a special shape can be covered with the body-side sheet 11*a*.

The applicator 1 on which the name of goods and the logo are marked can be presented by printing the name of goods and the logo of the applicator 1 in advance on the thermo-shrinking type resin sheet side corresponding to the body-side sheet 11*a*, utilizing the large area of the body-side sheet 11*a*.

Figure 5A:
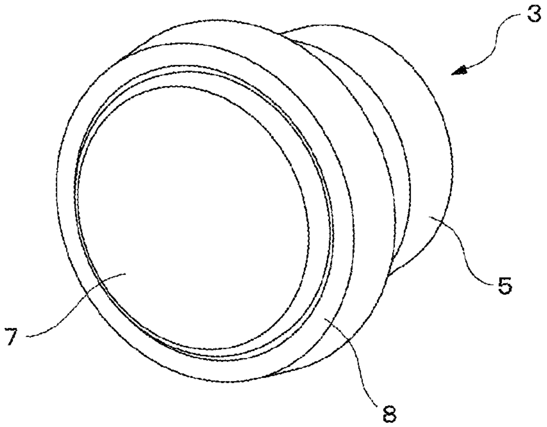
FIGS. 5A through 5C are views showing an assembly drawing of the first embodiment of the application unit.
Figure 5B:
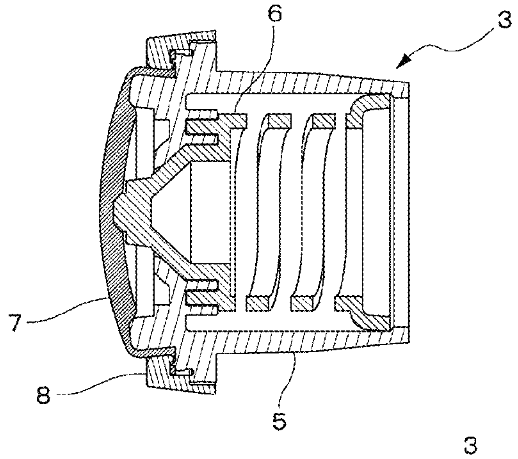
Figure 5C:
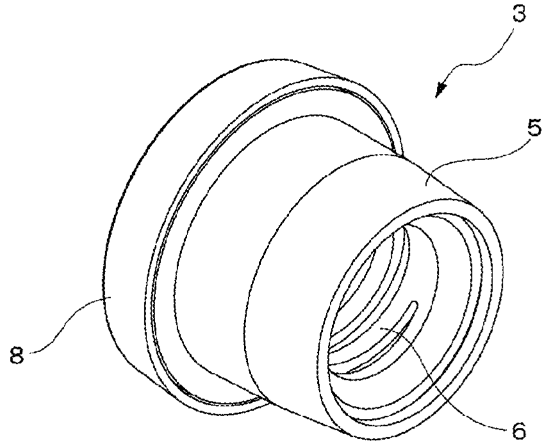

FIGS. 5A through 5C show the application unit 3 of the first embodiment to be attached to the mouth 2*c* of the container 2. The application unit 3 is composed of a valve seat member 5 which has a cylindrical shape and is provided with a valve opening at the front portion, a valve body member 6 having a valve body housed in the valve seat member 5 and biased by a spring member, a sheet-like application member 7 attached to the front side of the valve seat member 5 and disposed in a state to cover the mouth 2*c* of the container 2, and a support ring for the application member 8 which attaches the peripheral portion of the application member 7 to the valve seat member 5.

Figure 6:
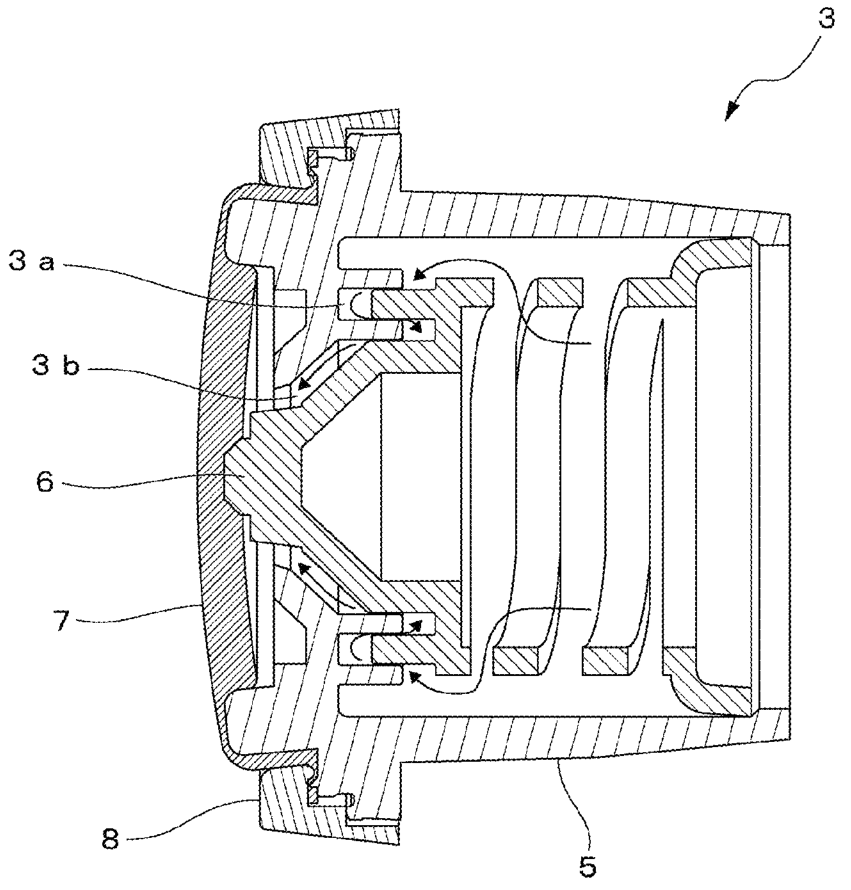
FIG. 6 is an enlarged cross-sectional view showing the liquid flow passage of the application unit of the first embodiment.

FIG. 6 shows a state where the inner plug (valve) 3*b* described later is opened by applying the application pressure to the application member 7 of the application unit 3 shown in FIGS. 5A to 5C; with this, a liquid flow passage 3*a* having a cross-section of an annulus (annular shape) is provided. The effects of the liquid flow passage 3*a* will be described later.

Each of the members constituting the application unit 3 of the first embodiment will be described below based on the single-item constitutional views.

FIGS. 7A through 7D show a single-item constitution of the valve seat member 5 constituting the application unit 3.

The valve seat member 5 has a cylindrical shape as a whole, the front side thereof is closed, and at the center thereof a valve opening 5*a* opens to function as an application liquid outlet. The valve seat 5*k* is formed at the periphery of the valve opening 5*a* having a funnel-like shape whose inner diameter reduces toward the front side. The valve opening 5*a* closes by attaching the valve body 6*c* which has a conical surface of the valve body member 6 to be described later to the valve seat 5*k*.

The outer circumferential surface of the valve seat member 5 is formed to have a constant diameter along the axial direction, configures a fitting portion 5*b* into the mouth 2*c* of the container 2, and has a tapered portion 5*c* whose outer diameter reduces slightly from the rear half portion toward rear end portion. The tapered portion 5*c* functions as a guide when the application unit 3 is attached to the mouth 2*c* of the container 2.

On the front side of the fitting portion 5*b* of the valve seat member 5, a flange portion 5*d* having a larger diameter than that of the fitting portion 5*b* is formed, and the flange portion 5*d* functions to position the application unit 3 by being in contact with the front end of the mouth 2*c* of the container 2.

Further, an annular locking part 5*e* is formed protruding inward in the opening at the rear end of the valve seat member 5. The annular locking part 5*e* functions as a stopper to inhibit the valve body member 6 to be described later from coming off, when the valve body member 6 is attached to the valve seat member 5.

Further, an annular protrusion 5*f* is formed on the front side of the valve seat member 5 and this functions to position the application member 7 to be described later by supporting the application member 7 from the rear side.

Figure 7A:
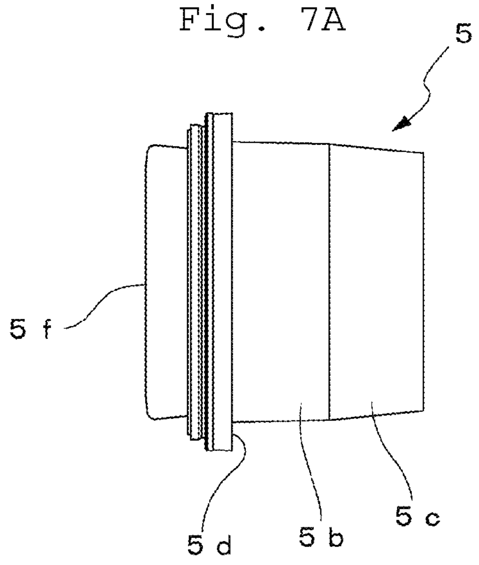
FIGS. 7A through 7D are views showing a single-item constitution of a valve seat member of the first embodiment.
Figure 7B:
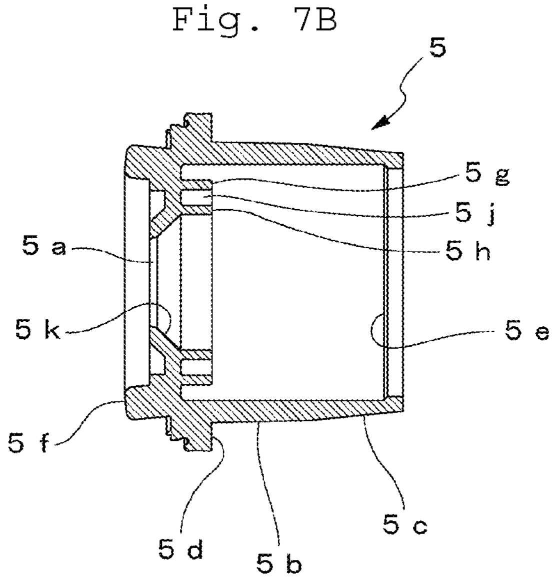
Figure 7C:
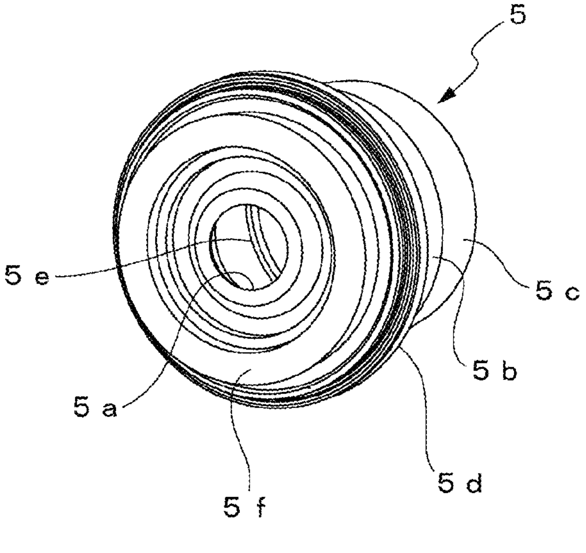
Figure 7D:
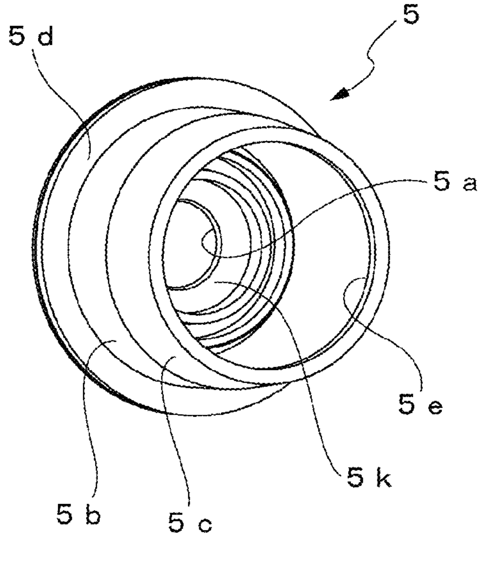

As shown in a cross-sectional view in FIG. 7B, two annular protrusions 5*g*, 5*h* are concentrically formed to surround the valve seat 5*k* inside the valve seat member 5. The two annular protrusions 5*g* and 5*h* are formed to have the same height toward the rear end side of the valve seat member 5, and thereby an annular groove 5*j* is formed between the annular protrusions 5*g* and 5*h*.

These annular protrusions 5*g* 5*h* and the annular groove 5*j*, in combination with a valve body member 6 to be described next, form a liquid flow passage 3*a* (See FIG. 6) having a meandering cross-section which introduces the application liquid in the container 2 to the application member 7 side.

For the sake of convenience of the description, among the two annular protrusions 5*g* and 5*h*, the inner protrusion formed continuing from the periphery of the valve seat 5*k* is called a first annular protrusion 5*h*, and the annular protrusion formed outside the first annular protrusion 5*h* is called a second annular protrusion 5*g*.

FIGS. 8A through 8E show a single-item constitution of the valve body member 6 configuring the application unit 3.

The valve body member 6 is integrally formed of elastic synthetic resin entirely and provided with a single spring member 6*b* extending upward from the ring member 6*a* in a spiral manner. A valve body 6*c* having a truncated conical shape is formed at the top end of the spring member 6*b*. A valve rod 6*d* is formed at the center of the valve body 6*c* to protrude from the valve body 6*c*.

Figure 8A:
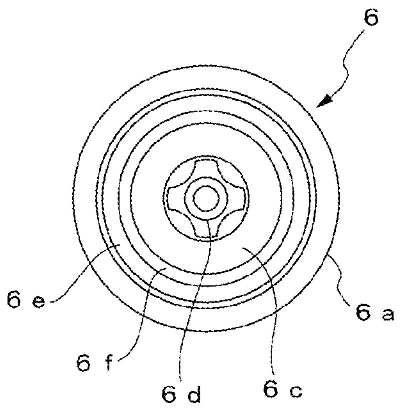
FIGS. 8A through 8E are views showing a single-item constitution of a valve body member of the first embodiment.
Figure 8B:
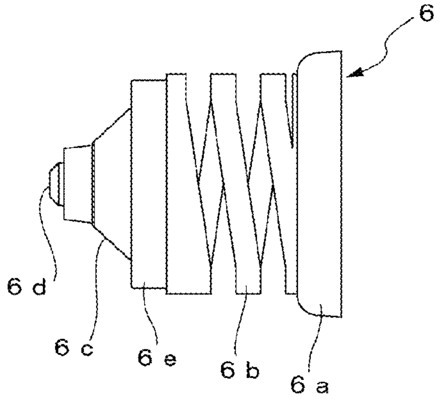
Figure 8C:
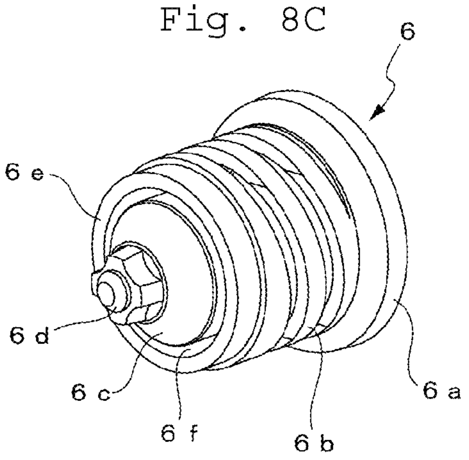
Figure 8D:
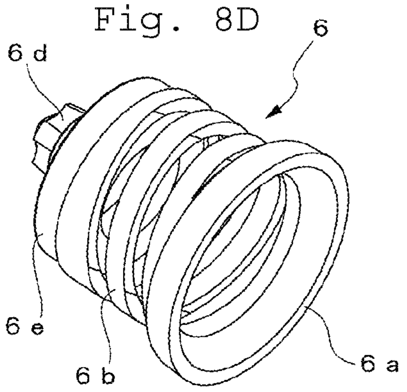
Figure 8E:
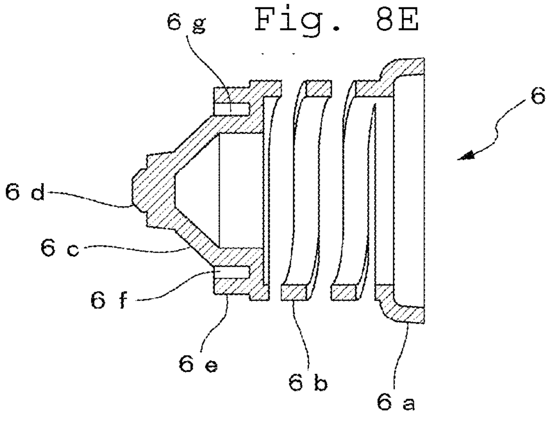

Further, as shown in FIG. 8E, an annular protrusion 6*e* (corresponding to the third annular protrusion) is formed to surround the valve body 6*c* having a conical shape, and an annular groove 6*f* is formed between the annular protrusion 6*e* and the annular circumferential side surface continuing from the periphery of the valve body 6*c*.

That is, the annular protrusion 6*e* is concentrically formed to the cylinder 6*g* the outside of the cylinder 6*g* which is connected to the periphery of the valve body 6*c*.

The outer diameter of the ring member 6*a* is formed to be approximately equal to the inner diameter of the valve seat member 5 formed in a cylindrical shape, and slightly larger than the inner diameter of the annular locking part 5*e*. Accordingly, the ring member 6*a* at the rear portion is housed in the valve seat member 5 climbing over the annular locking part 5*e* of the valve seat member 5 by inserting and pushing the valve rod 6*d* of the valve body member 6 from the annular locking part 5*e* side at the rear end portion of the valve seat member 5. Then, the ring member 6*a* of the valve body member 6 is disposed inside the valve seat member 5 in a state of being locked by the annular locking part 5*e* of the valve seat member 5 (See FIG. 5B.)

Thus, the valve body 6*c* is in contact with the valve opening 5*a* to be in a closed state, and the valve rod 6*d* at the center is in a state of slightly protruding forward from the valve opening 5*a*.

As described above, in the state where the valve body member 6 is attached to the valve seat member 5, the annular protrusion 6*e* of the valve body member 6 is housed in the annular groove 5*j* formed on the valve seat member 5, and the first annular protrusion 5*h* of the valve seat member 5 is housed in the annular groove 6*f* of the valve body member 6. Then, the second annular protrusion 5*g* of the valve seat member 5 is located at the outside of the annular protrusion 6*e*. With this configuration, a meandering liquid flow passage 3*a* is formed between the valve seat member 5 and the valve body member 6, as the flow of the application liquid is shown by an arrow in FIG. 6. The meandering liquid flow passage 3*a* is formed just before the inner plug (valve) 3*b* which is formed between the valve seat 5*k* of the valve seat member 5 and the valve body 6*c* of the valve body member 6.

With the liquid flow passage 3*a*, for example, the total length of the gap (the first flow passage through the fourth flow passage to be described later) formed between the annular protrusions 5*g* and 5*h* of the valve seat member 5 and the annular protrusion 6*e* of the valve body member 6 changes in response to the retracting operation of the valve body 6*c* due to the application pressure applied to the valve rod 6*d* of the valve body member 6. In other words, the total length of the gap in the liquid flow passage 3*a* becomes smaller as the application pressure applied to the valve body member 6 increases.

Then, the flow resistance to the application liquid decreases, and the supply amount of the application liquid, which cannot solely be controlled appropriately by the degree of opening of the inner plug (valve) 3*b*, can be controlled in the liquid flow passage 3*a*.

Further, in cases where a liquid having a low viscosity and low surface tension, in particular, is used as an application liquid, an applicator can be presented in which the liquid flow passage 3*a* controls the excessive flow of the application liquid with an appropriate flow resistance and prevents a sudden flowing out of the liquid from the application member 7.

Figure 9A:
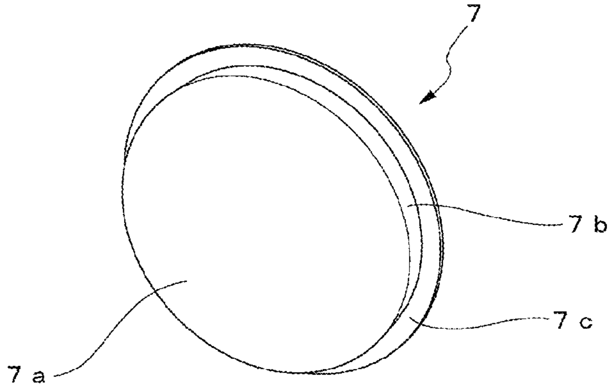
FIGS. 9A through 9C are views showing a single-item constitution of an application member.
Figure 9B:
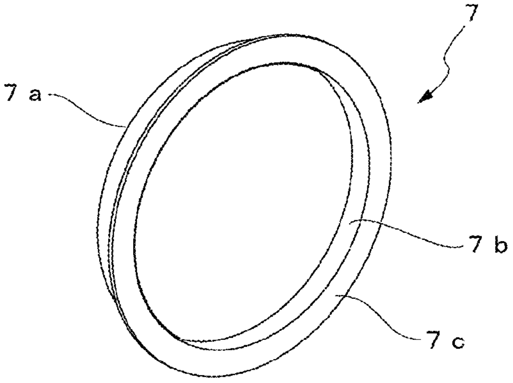
Figure 9C:
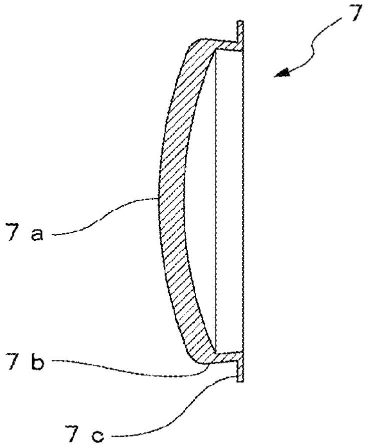

FIGS. 9A through 9C show a single-item constitutional view of an application member 7 constituting the application unit 3.

The application member 7 is formed of flexible foamed sheet material. As the foamed sheet material, open-cell-foam polyurethane or polyethylene material, and further, rubber sponge are preferably employed, but the use of foamed urethane is desirable from the view of durability.

For the application member 7, a circularly-cut foamed sheet material is used; a spherical convex portion 7*a* at the center, a short-length cylindrical portion 7*b* which is formed at the periphery of the spherical convex portion 7*a*, and an annular flange portion 7*c* outwarding at the edge of the cylindrical portion 7*b* are formed, by conforming the front side shape of the valve seat member 5.

At the portion of the application member 7 where the spherical convex portion 7*a* is formed at the center, the thickness of the foamed sheet material is kept as it is, and the short-length cylindrical portion 7*b* at its periphery and the flange portion 7*c* are formed by press processing, for example, such that the thickness thereof is thinner than that of the spherical convex portion 7*a*.

Figure 10A:
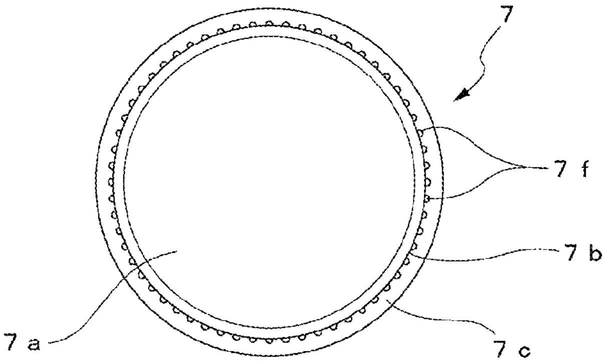
FIGS. 10A through 10C are views showing a partially deformed state due to the attachment of the application member shown in FIG. 9A to the applicator.
Figure 10B:
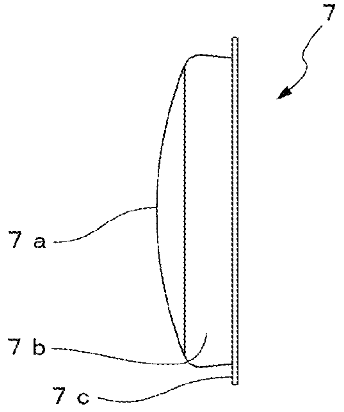
Figure 10C:
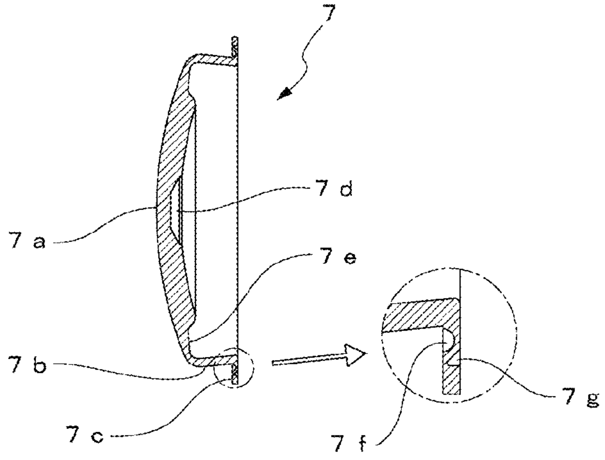

FIGS. 10A through 10C show the application unit 7 shown in FIGS. 9A through 9C is partially deformed by being attached to the application unit 3 shown in FIGS. 5A through 5C.

In other words, on the rear side of the spherical convex portion 7*a*, a recess 7*d* is formed that is deformed by the tip portion of the valve rod 6*d* which protrudes from the central part of the valve seat member 5 as shown in FIG. 10C. On the rear side of the spherical convex portion 7*a*, an annular recess 7*e* is formed along the inside of the cylindrical portion 7*b* so as to surround the recess 7*d* of the central portion. This is formed by deforming by being in contact with the annular protrusion 5*f* protruding toward the front side of the valve seat member 5.

On the front side of the annular flange portion 7*c*, a large number of recesses 7*f* by the multiple small protrusions 8*d* which are formed on the support ring for the application member 8 deformed by being pressed by the support ring for the application member 8 side to be described later. Further, on the rear side of the flange portion 7*c*, a groove 7*g* is formed by being pressed and deformed by the valve seat member 5.

Figure 11A:
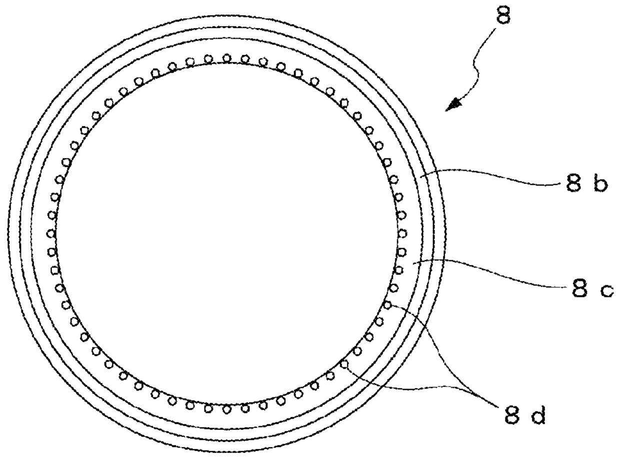
FIGS. 11A through 11C are views showing a single-item constitution of a support ring for the application member.
Figure 11B:
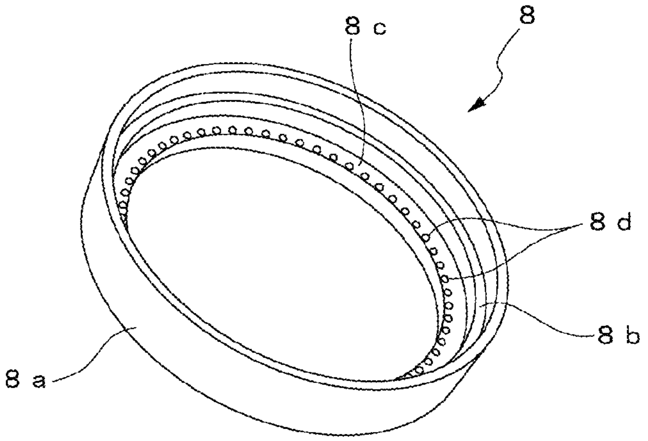
Figure 11C:
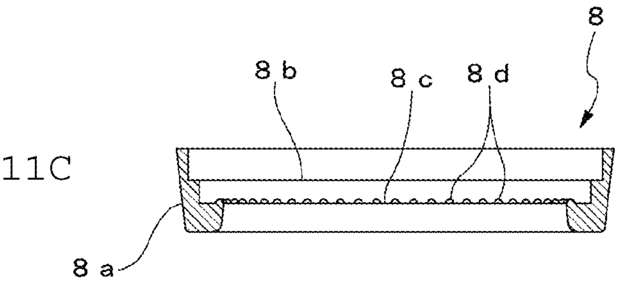

FIGS. 11A through 11C show a single-item constitutional view of the support ring for the application member 8 constituting the application unit 3.

The support ring for the application member 8 supports the planar application member 7 along its periphery by pressing the periphery of the application member 7 attached to the front side of the valve seat member 5 along the front side periphery of the valve seat member 5.

The support ring for the application member 8 is formed of a resin material and has a tapered surface 8*a* whose outer diameter slightly reduces from the rear side to the front side. Inside thereof, an annular first step 8*b* and an annular second step 8*c* whose diameters slightly reduce from the rear side to the front side are concentrically formed.

Further, on the second step 8*c*, multiple small protrusions 8*d* protruding toward the rear side are continuously formed along the circumference. The application member 7, which is pressed to the front side of the valve seat member 5 by the support ring for the application member 8, is supported by the multiple small protrusions 8*d* without being loosened. The application unit 3 shown in FIGS. 5A through 5C is constituted by welding the support ring for the application member 8 to the flange portion 5*d* of the valve seat member 5.

The application unit 3 is attached to the mouth 2*c* of the container 2 using the tapered portion 5*c* of the valve seat member 5 and fitted to attach to the mouth 2*c* of the container 2 using the fitting portion 5*b* of the valve seat member 5 (See FIG. 3.)

Figure 12A:
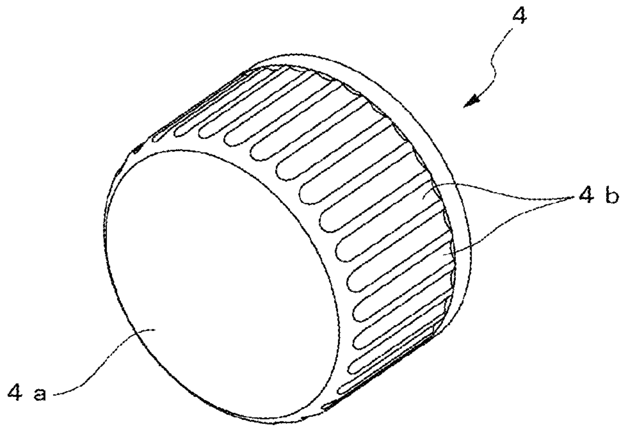
FIGS. 12A through 12C are views showing a single-item constitution of a cap.
Figure 12B:
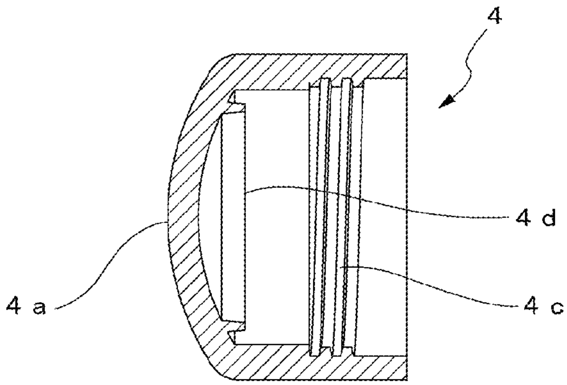
Figure 12C:
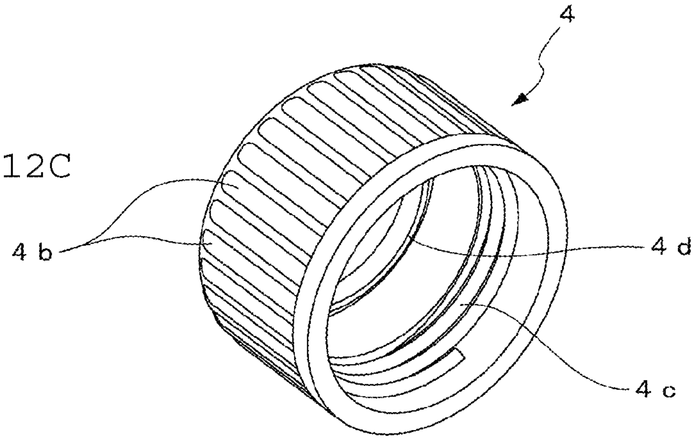

FIGS. 12A through 12C show a single-item constitutional view of the cap 4. The cap 4 is a cylindrical shape, one end of which is closed with a top surface 4*a*, and on whose outer surface a large number of knurls 4*b*, having groove-like recesses along the axial direction, are formed continuously in the circumferential direction.

Female threads 4*c* are formed on the inner circumferential surface at the opening side, and an annular protruding ridge 4*d* with a ring-like shape is formed protruding in the axial direction on the rear side of the top surface 4*a*, located at the deep side of the female threads 4*c*.

The cap 4 can be attached to the mouth 2*c* by being put onto the mouth 2*c* of the container 2, then threading the female thread 4*c* of the cap 4 to the male thread 2*e* of the mouth 2*c* as shown in FIG. 3; this brings the applicator 1 in a storing state where the application member 7 of the application unit 3 is covered with the cap 4.

At this time, since the annular protruding ridge 4*d* in the cap 4 is in contact with the support ring for the application member 8 of the application unit 3 to seal the application member, the volatilization of the solvent of the application liquid from the application member 7 is inhibited.

Figure 13A:
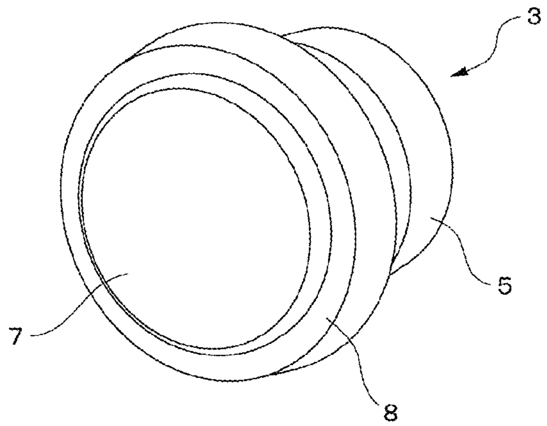
FIGS. 13A through 13C are views showing an assembly drawing of the second embodiment of the application unit.
Figure 13B:
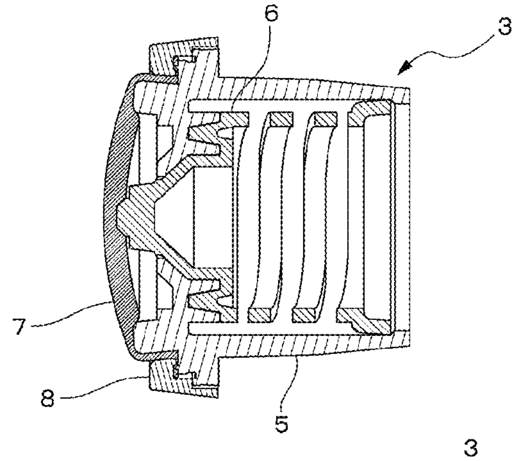
Figure 13C:
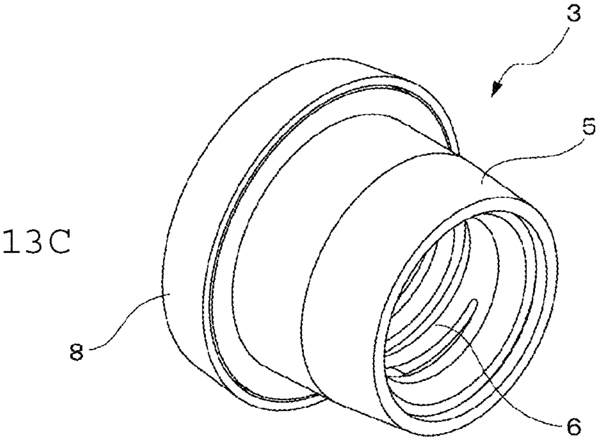
Figure 14:
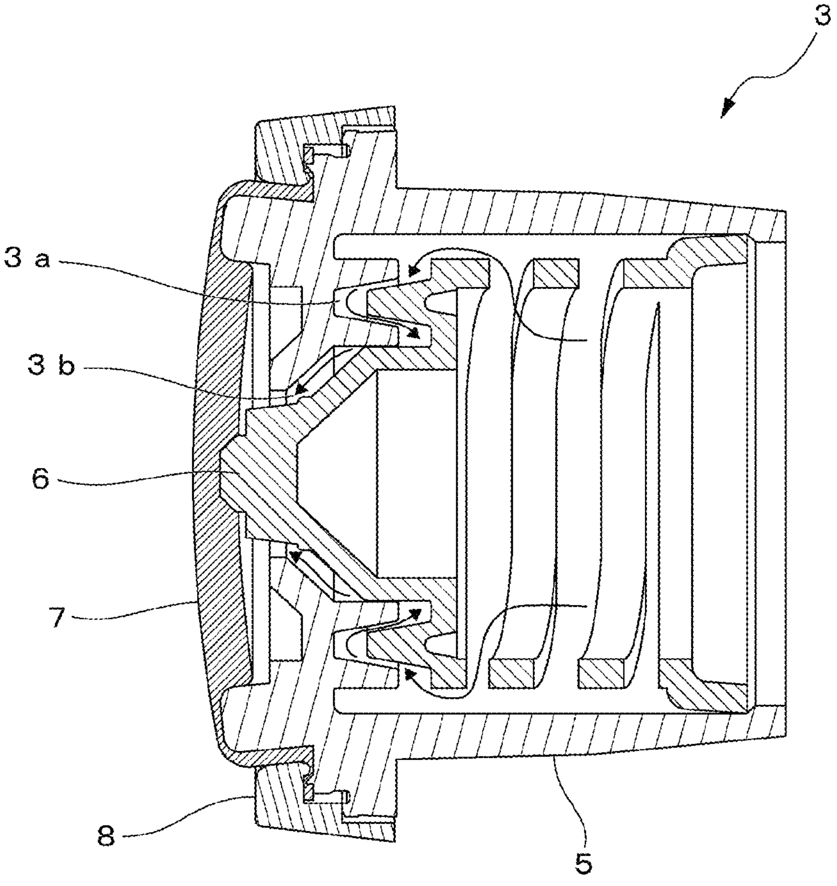
FIG. 14 is an enlarged cross-sectional view showing the liquid flow passage of the application unit of the second embodiment.

FIGS. 13A through 13 C, FIG. 14, FIGS. 15A through 15D, and FIGS. 16A through 16E show the application unit 3 of a second embodiment which is preferably usable for the applicator 1 of the present invention. In the second embodiment of the application unit 3 shown in FIGS. 13A through 13 C, FIG. 14, FIGS. 15A through 15D, and FIGS. 16A through 16E, the same referential signs are given to portions that perform the same functions as the portions of the application unit 3 described above shown in FIGS. 5A through 5C, FIG. 6, FIGS. 7A through 7D, and FIGS. 8A through 8E do. Thus, the detailed description of each portion will be appropriately omitted.

Figure 15A:
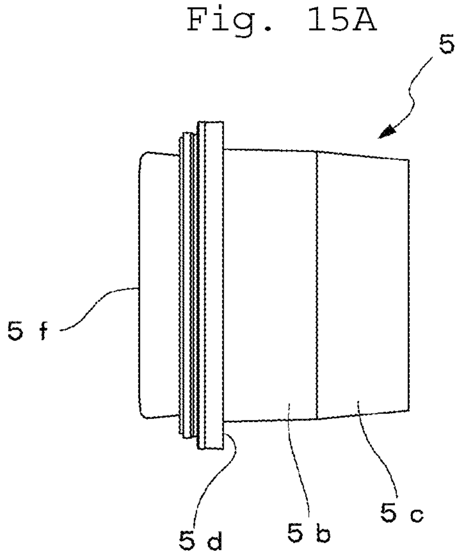
FIGS. 15A through 15D are views showing a single-item constitution of a valve seat member of the second embodiment.
Figure 15B:
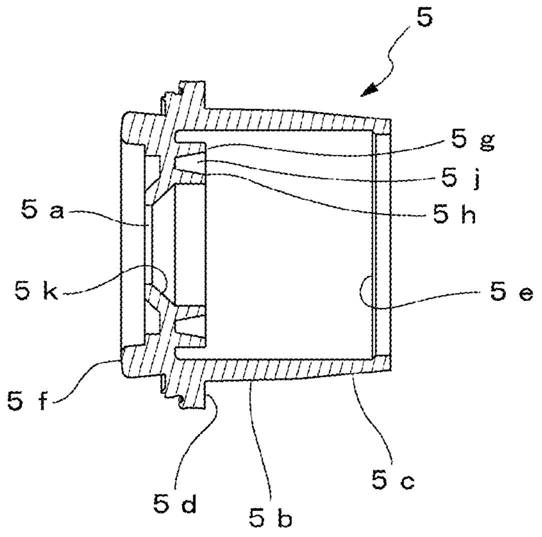
Figure 15C:
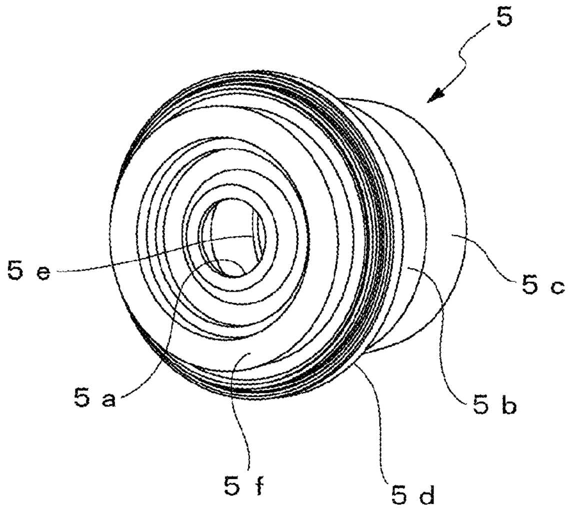
Figure 15D:
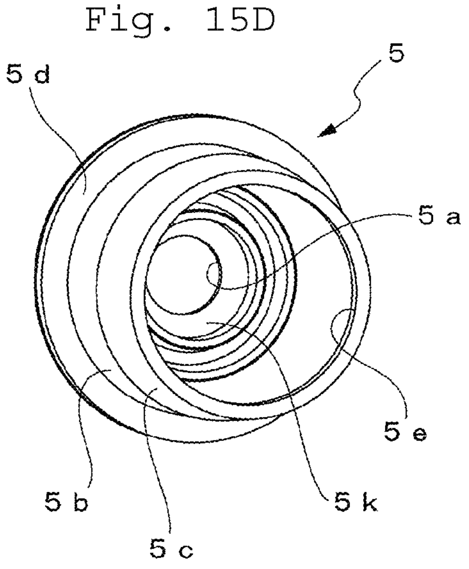

FIG. 15B is a cross-sectional view showing a single-item constitution of the valve seat member 5 of the application unit 3 of the second embodiment.

As shown in FIG. 15B, the annular groove width of the annular groove 5*j*, which is held between the inner first annular protrusion 5*h* and the outer second annular protrusion 5*g* both concentrically formed, is configured to become narrower as toward the inner bottom of the annular groove 5*j*.

In other words, the outer circumferential surfaces of the inner first annular projection 5*h* and the inner circumferential surface of the outer second annular projection 5*g*, which face each other through the annular groove 5*j*, are tapered in cross-section with an approximately identical inclination angle to each other in the axial direction.

The inner surface of the first annular protrusion 5*h* and the outer surface of the second annular protrusion 5*g* are configured to be parallel to the axial direction of the valve seat member 5; this is the same as the valve seat member 5 of the first embodiment shown in FIGS. 7A through 7D. Further, the configuration of the other portions of the valve seat member 5 shown in FIGS. 15A through 15D of the application unit 3 of the second embodiment is the same as the configuration of the other portions of the valve seat member 5 of the first embodiment shown in FIGS. 7A through 7D.

Figure 16A:
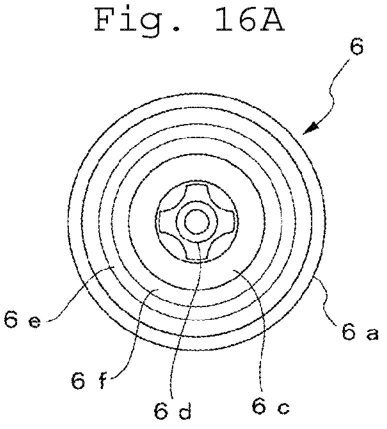
FIGS. 16A through 16E are views showing a single-item constitution of a valve body member of the second embodiment.
Figure 16B:
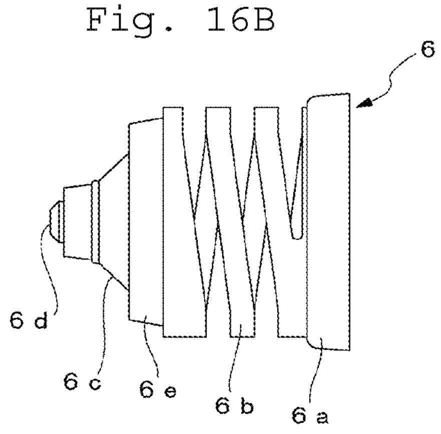
Figure 16C:
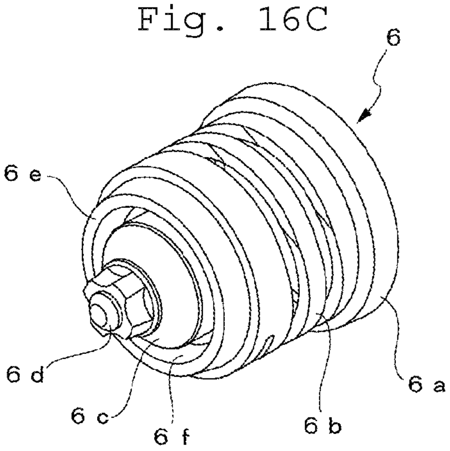
Figure 16D:
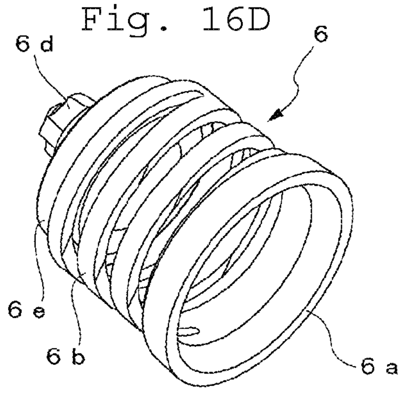
Figure 16E:
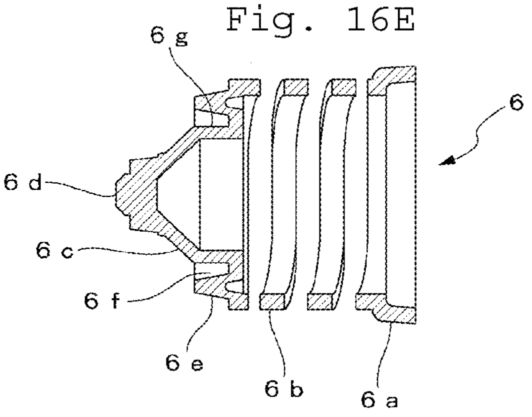

Meanwhile, FIG. 16E shows the cross-sectional view of the single-item constitution of the valve body member 6 of the application unit 3 of the second embodiment.

As shown in FIG. 16E, the annular protrusion 6*e* formed on the outside of the valve body 6*c* provided in the valve body member 6 is configured such that the inner surface and the outer surface of the annular protrusion 6*e* narrow the width of the annular protrusion 6*e* toward the upper portion of the protrusion.

In other words, the inner surface and the outer surface of the annular protrusion 6*e* have approximately the same inclination angle to each other with respect to the axial direction, and the width of the top portion is configured to become narrow, whereby the cross-section of the annular protrusion 6*e* is a tapered shape.

When the application unit 3 is assembled, as shown in FIG. 13B, the annular groove 5*j* having a tapered cross-section formed between the first annular protrusion 5*h* and the second annular protrusion of the valve seat member 5 is configured to face the annular protrusion 6*e* having a tapered cross-section of the valve body member 6 with a slight gap.

The configuration of other portions of the valve body member 6 shown in FIGS. 16A through 16E of the application unit 3 of the second embodiment is the same as the configuration of the valve body member 6 of the first embodiment shown in FIGS. 8A through 8E.

An application liquid such as a cosmetic liquid or medicinal solution is contained in the container 2 of the applicator 1. To the application liquid, to the extent not affecting the performance as a cosmetic liquid or medicinal solution, resins, cohesion/dispersion agents, extender pigments, complementary color pigments, surfactants, antiseptics, wetting agents, defoaming agents, rust inhibitors, pH adjusters, foam depressants, foam absorbers, shear viscosity reducing agents and viscosity modifiers can be added as needed.

In this case, the viscosity of the application liquid is desirably to be 0.1 to 1000 mPa·s. The viscosity of the liquid can be measured using a B-type viscometer (Brookfield, DV-II), for example, at a revolution number of 6 rpm with the T-E1 rotor under the environment of a temperature of 25° C. and humidity of 65% which is compliant with ISO554: 1976 (standard atmosphere for conditioning and/or testing).

Further, liquids with low viscosity in a range from 0.1 to $10^{-6}$ Pa·s of alcohols such as ethanol, isopropanol, polyhydric alcohols such as propylene glycol, dipropylene glycol, or purified water can be stored. The liquid may contain different ingredients depending on the intended use. In the case of pharmaceuticals, antiphlogistic analgesic ingredients (e.g., felbinac, indomethacin, glycol salicylate), antihistamines (e.g., diphenhydramine hydrochloride, chlorpheniramine maleate), blood circulation promoting ingredients (e.g., nonanoic acid vanillyl amide), refreshing agents (e.g., 1-menthol), preservatives, stabilizers, pH adjusters are listed. For cosmetics, antiperspirant ingredients (e.g., aluminum chlorohydrate, zinc para-phenol sulfonate), germicidal ingredients (e.g., benzalkonium chloride, benzethonium chloride), deodorant ingredients (e.g., *Sophora flavescens* extract, etc.), fragrances, and others are listed.

In the case where the above-described content liquid is used, the application member is made of low-density polyethylene, which is excellent in absorbing/releasing characteristics of the application liquid and has strength and a good touch feeling. The low-density polyethylene may be any one of high-pressure low-density polyethylene or linear low-density polyethylene, and the density is normally 0.910 to 0.930 g/cm$^3$. The average pore size is preferably 50 to 180 μm because if too large, the retention of the impregnated application liquid decreases and is prone to drip, and if too small, the permeability and release properties of the application liquid decrease. The average pore size is measured with a mercury-penetration porosimeter. The bulk density (value of the weight of the application member divided by the apparent volume thereof) of the application member is preferably 0.15 to 0.25 g/cm$^3$ because if it is too large, the permeability and release properties are reduced, and if it is too small, the retention of the application liquid is reduced. Furthermore, the application member is preferably made of an open-cell foam having an open-cell ratio equal to or higher than 70% measured based on ASTM D 1940-62T, whereby the absorbent/release and retention properties of the application liquid can be excellent. The thickness of the application member is preferably 0.5 to 3.5 mm, because if it is too thick, the deformation due to swelling is likely to increase and the release properties of the application liquid are likely to decrease, while if it is too thin, the touch feeling is likely to deteriorate.

In the application unit 3 of the applicator 1 of the embodiment described above, an inner plug (valve) 3*b* is mounted which is composed of a funnel-shaped valve seat 5*k* of the valve seat member 5 and a valve body 6*c* having a cone-shaped face of the valve body member 6.

The valve rod 6*d* of the valve body member 6 can be retracted while resisting the biasing force of the spring member 6*b* through the application member 7 by pressing the application member 7 against the application surface. Thereby the seal of the valve body 6*c* to the valve opening 5*a* is released, and the application liquid in the container 2 is supplied and absorbed by the application member 7. Then, application is performed by the exuding of application liquid from the application member 7 to the application surface.

In this situation, the liquid flow passage 3*a* of the application liquid having a meandering shape is formed just before the inner plug 3*b* of the application unit 3; the liquid flow passage 3*a* can inhibit an excessive flow of the application liquid and prevent the sudden flowing out of the liquid from the application member 7, as described previously.

The relationship between the considerations on the flow resistance (pressure loss) due to the liquid flow passage 3*a* having a cross-section of an annulus (annular shape) to the application liquid and evaluation of the appropriate discharge amount (flow rate) of the application liquid using the actual applicator will be described below.

Figure 17:
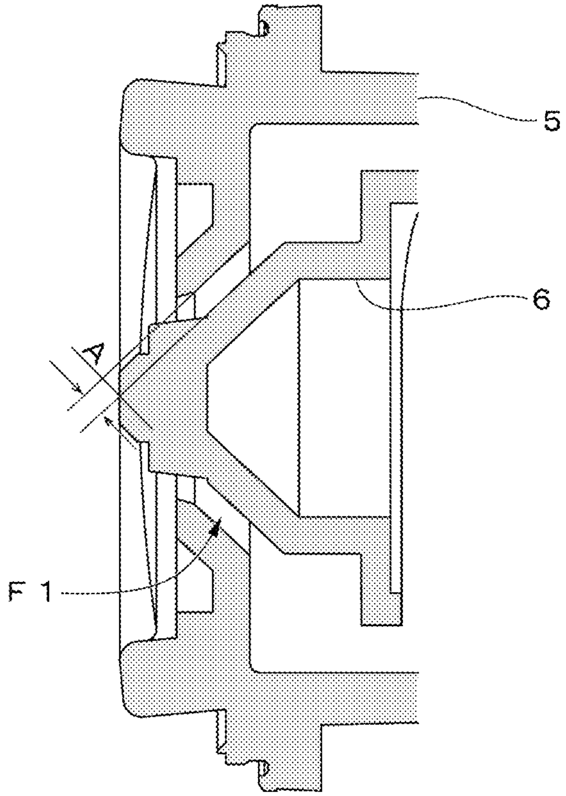
FIG. 17 is a partial cross-sectional view showing a fluid passage in a conventional application unit, for the comparison of flow resistance.
Figure 18:
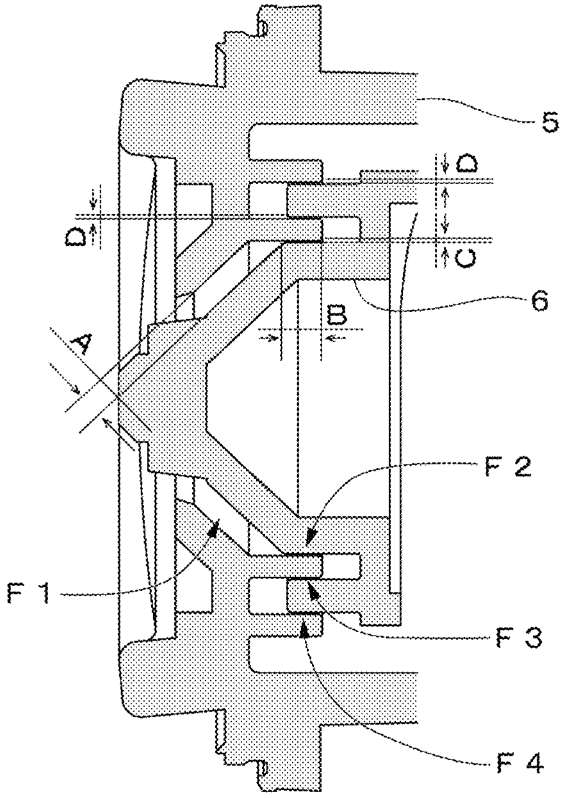
FIG. 18 is a partial cross-sectional view of a fluid passage in the application unit of the first embodiment.
Figure 19:
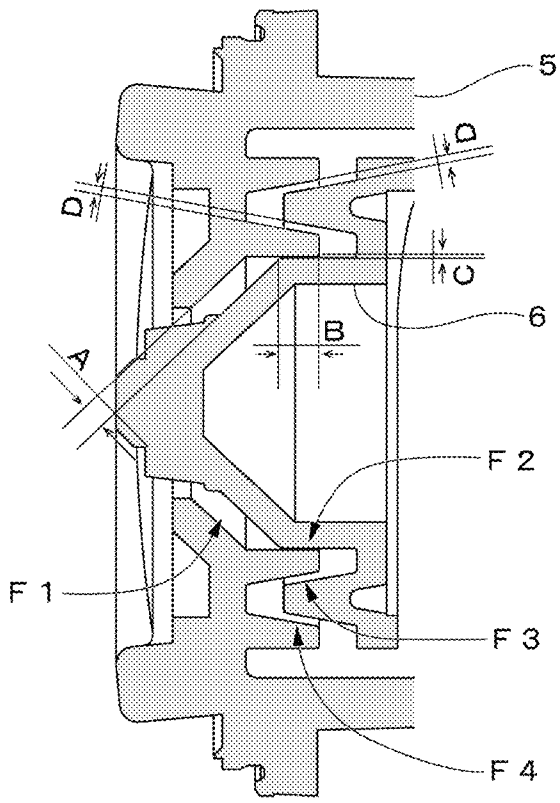
FIG. 19 is a partial cross-sectional view of a fluid passage in the application unit of the second embodiment.
Figure 21:
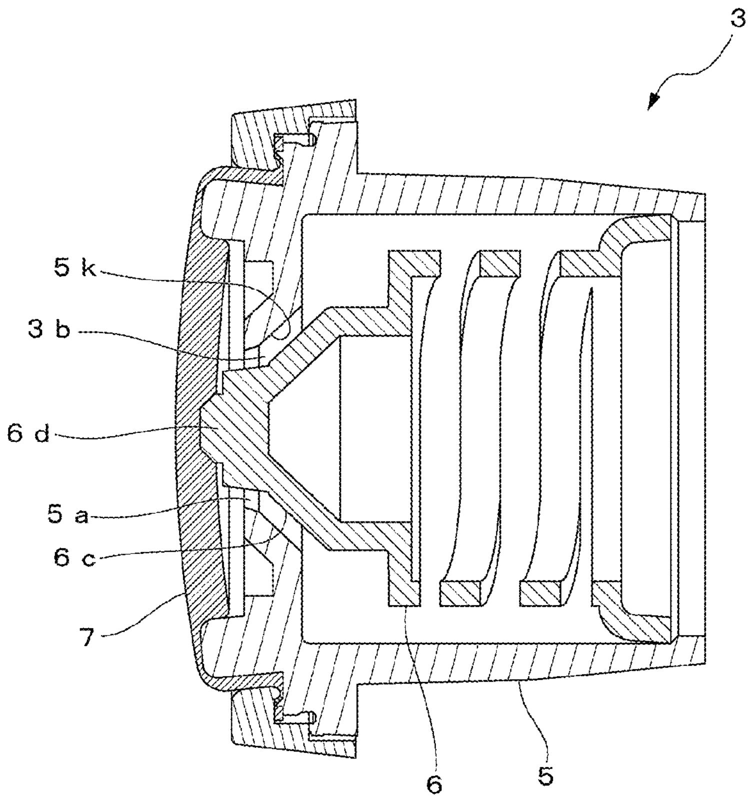
FIG. 21 is a cross-sectional view showing an example of the application unit used in a conventional applicator.

FIGS. 17 to 19 are partially enlarged cross-sectional views illustrating the liquid flow passage formed between the valve seat member 5 and the valve body member 6; FIG. 17 shows the liquid flow passage formed in the conventional application unit that is described based on FIG. 21 for comparison. FIG. 18 illustrates the liquid flow passage formed in the application unit 3 of the first embodiment shown in FIG. 6. Furthermore, FIG. 19 shows the liquid flow passage formed in the application unit 3 of the second embodiment shown in FIG. 14.

In the description below, the shape of the flow passage shown in FIG. 17 is called blank, the shape of the flow passage shown in FIG. 18 is called straight clearance, and the shape of the flow passage shown in FIG. 19 is called tapered clearance.

Principal regions including flow resistance in respective shapes in FIG. 17 through FIG. 19 are shown with signs F1, F2, F3, and F4. These four positions communicated in series with each other in a meandering manner are called the first flow passage through the fourth flow passage; the positions of the disposition of these flow passages are identified as follows:

The first flow passage (F1): A flow passage formed between the valve seat 5*k* of the valve seat member 5 constituting the application unit 3 and the valve body 6*c* of the valve body member 6, which confronts the valve seat 5*k*.

The second low passage (F2): A flow passage formed between the circumferential surface of the cylinder 6*g* connected to the periphery of the valve body 6*c* of the valve body member 6 and the inner circumferential surface of the first annular protrusion 5*h* formed in connection to the periphery of the valve seat 5*k*.

The third low passage (F3): A flow passage formed between the outer circumferential surface of the first annular protrusion 5*h* and the inner circumferential surface of the annular protrusion 6*e* concentrically formed outside the cylinder 6*g* in the valve seat member 5.

The fourth flow passage (F4): A flow passage formed between the outside of the annular protrusion 6*e* of the valve body member 6 and the inside of the second annular protrusion 5*g* concentrically formed outside of the first annular protrusion 5*h* of the valve seat member 5.

The length of the flow passage and the cross-sectional areas of the flow passages of the first flow passage through the fourth flow passage vary depending on the pushing amount (valve stroke) of the valve rod 6*d* of the valve body member 6. The numerical values of the gap dimension and the length dimension indicated in FIGS. 17 to 19 with signs A to D are given in Table 1 as values corresponding to valve strokes of 0.5 mm, 1.0 mm, and 1.5 mm.

TABLE 1

| | Blank | | | Straight Clearance | | | Tapered Clearance | | |
|---|---|---|---|---|---|---|---|---|---|
| | Stroke 0.5 mm | Stroke 1.0 mm | Stroke 1.5 mm | Stroke 0.5 mm | Stroke 1.0 mm | Stroke 1.5 mm | Stroke 0.5 mm | Stroke 1.0 mm | Stroke 1.5 mm |
| A | 0.34 mm | 0.68 mm | 1.02 mm | 0.34 mm | 0.68 mm | 1.02 mm | 0.34 mm | 0.68 mm | 1.02 mm |
| B | — | — | — | 1.4 mm | 0.9 mm | 0.4 mm | 1.4 mm | 0.9 mm | 0.4 mm |
| C | — | — | — | 0.1 mm | 0.1 mm | 0.1 mm | 0.1 mm | 0.1 mm | 0.1 mm |
| D | — | — | — | 0.1 mm | 0.1 mm | 0.1 mm | 0.12 mm | 0.29 mm | 0.37 mm |

As for the straight clearance shown in FIG. 18, as the valve stroke changes, the value A in Table 1 changes as well as the value B. In contrast, as for the tapered clearance shown in FIG. 19, as the valve stroke changes, the value A changes as well as the value B and further the value D. In other words, as for the straight clearance, the length of the flow passage changes as the valve stroke changes. In contrast to this, as for the tapered clearance, the length of the flow passage changes, and further the cross-sectional area of the flow passage, as the valve stroke changes.

Thus, the preferred pressure loss the application unit 3 has is to be obtained by verifying the relationship between the total sum of the straight pipe pressure loss (total pressure loss) of the first flow passage through the fourth flow passage, which is obtained by calculating the straight pipe pressure loss of each of the first flow passages to the fourth flow passage, and the degree of dispense of the application liquid against the applied pressure value to the container 2 by the actual article of the applicator 1.

The straight pipe pressure loss is obtained based on the following conditions:

1. Each flow passage is denoted a first flow passage, a second flow passage, a third flow passage, and a fourth flow passage from the application member 7 of the application unit 3 toward the container 2 thereof;
2. The cross-sectional area (an average value) and the length of flow passage at each valve stroke (0.5 mm, 1.0 mm, and 1.5 mm) are obtained;
3. Each flow passage is regarded as a straight pipe obtained based on the area;
4. No pressure loss at each flow passage (outlet and inlet, expanded or reduced, and bending) shall be considered;
5. The measurement of flow resistance indicates that the flow is laminar.

Figure 20A:
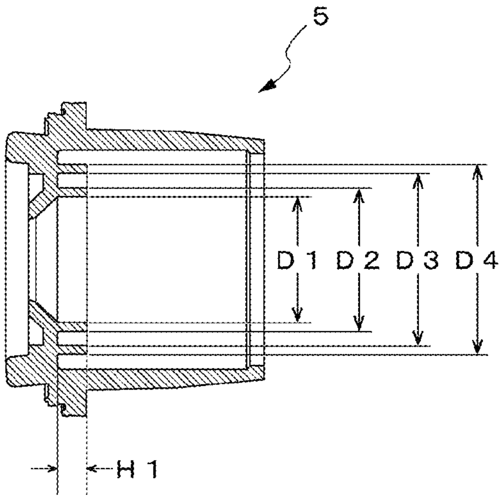
FIGS. 20A and 20B are diagrams showing the positions of measuring each portion in the application unit of the first embodiment.
Figure 20B:
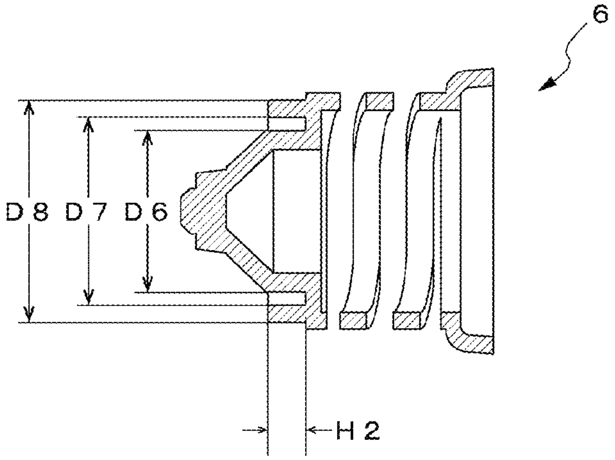

In obtaining the straight pipe pressure loss, each measurement position at the valve seat member 5 and the valve body member 6 are shown in FIGS. 20A and 20B; the value at each measurement position is as follows:

$$D1=\varnothing 8,\ D2=\varnothing 9.8,\ D3=\varnothing 11.8,\ D4=\varnothing 13.0,\ H1=2.0\text{ mm},$$

$$D6=\varnothing 8.5,\ D7=\varnothing 9.9,\ D8=\varnothing 11.7,\text{ and } H2=2.0\text{ mm}.$$

The straight pipe pressure loss is inversely proportional to the square of the cross-sectional area of the flow passage and proportional to the length of the flow passage, according to Darcy-Weisbach's Eq. 1. Eq. 1 can be expanded as Eq. 2, and further, the pressure loss per the flow rate 1 $m^3/s$ is rewritten as Eq. 3.

$$\Delta P = 32\ \mu Lv/d^2, \quad \text{Eq. 1}$$

$$\Delta P = 32\ \mu LR/Sd^2, \quad \text{Eq. 2}$$

$$\Delta P/R = 32\ \mu L/Sd^2, \quad \text{Eq. 3}$$

where ΔP is the pressure loss (Pa), R is the flow rate ($m^3/s$), μ is the viscosity of the application liquid, L is a representative length (m) of the flow passage, S is a representative cross-sectional area ($m^2$) of the flow passage, and d is the hydraulic diameter (m).

The hydraulic diameter d is calculated in the embodiment from the annulus (circular pipe) shape and the annulus d is defined as d=dout−din, where dout is the outer diameter and din is the inner diameter.

As the viscosity of the application liquid (μ), the viscosity of alcohol $\mu=1.096$ mPa·s$=1.096\times10^{-3}$ Pa·s is used. Further, the flow rate is R=1 mL/s$=10^{-6}$ $m^3/s$, and the flow velocity is v=R/S (m/s).

Foamed urethane is used as the application member 7 in the application unit 3 here; the flow resistance of the application member 7 made of foamed urethane is small due to the large cross-sectional area and the short flow passage. The flow resistance is equal to or less than 0.1 kPa/(mL/s) according to the measured value. Thus, since the value of the flow resistance due to the application member 7 is extremely small compared to each value of the first flow passage through the fourth flow passage, it can be ignored.

Table 2 shows the values of the individual pressure loss of each of the first flow passages to the fourth flow passage calculated by Eq. 3 for the blank case in FIG. 17, the straight clearance case in FIG. 18, and the tapered clearance case in FIG. 19.

Further, in Table 2, the verification results of the flow rate of the application liquid by the actual application unit 3 and the evaluation results of the obtainment of the range of the appropriate pressure loss (total pressure loss) are also shown.

TABLE 2

| | | Blank | Straight Clearance (First Embodiment) | | | |
|---|---|---|---|---|---|---|
| | | Comparative Example | Comparative Example 2 | Example 1 | Example 2 | Example 3 |
| | Stroke Length (mm) | 1.5 | 1.5 | 1.5 | 1.5 | 1.5 |
| Flow Passage 1 | Outer Diameter at the Center (mm) | 9.87 | 9.87 | 9.87 | 9.87 | 9.87 |
| | Inner Diameter at the Center (mm) | 7.82 | 7.82 | 7.82 | 7.82 | 7.82 |
| | Average Length (mm) | 1.69 | 1.69 | 1.69 | 1.69 | 1.69 |

TABLE 2-continued

| | | | | | | |
|---|---|---|---|---|---|---|
| | Area of Flow Passage ($mm^2$) | 28.38 | 28.38 | 28.38 | 28.38 | 28.38 |
| | Length of Flow Passage (mm) | 1.69 | 1.69 | 1.89 | 1.69 | 1.69 |
| | Hydraulic Diameter (m) dh = Dout − Din (Annulus) | 2.04E−03 | 2.04E−03 | 2.04E−03 | 2.04E−03 | 2.04E−03 |
| | Pressure Loss ($m^3/s$) | 5.00E+05 | 5.00E+05 | 5.00E+05 | 5.00E+05 | 5.00E+05 |
| Flow Passage 2 | Outer Diameter at the Center (mm) | | 8.60 | 8.80 | 8.60 | 8.60 |
| | Inner Diameter at the Center (mm) | | 8.56 | 8.50 | 8.40 | 8.30 |
| | Average Length (mm) | | 0.40 | 0.40 | 0.40 | 0.40 |
| | Area of Flow Passage ($mm^2$) | | 0.54 | 1.34 | 2.67 | 3.98 |
| | Length of Flow Passage (mm) | | 0.40 | 0.40 | 0.40 | 0.40 |
| | Hydraulic Diameter (m) dh = Dout − Din (Annulus) | | 4.00E−05 | 1.00E−04 | 2.00E−04 | 3.00E−04 |
| | Pressure Loss ($m^3/s$) | | 1.83E+10 | 1.05E+09 | 1.31E+08 | 3.92E+07 |
| Flow Passage 3 | Outer Diameter at the Center (mm) | | 10.00 | 10.00 | 10.00 | 10.00 |
| | Inner Diameter at the Center (mm) | | 9.96 | 9.90 | 9.80 | 9.70 |
| | Average Length (mm) | | 0.40 | 0.40 | 0.40 | 0.40 |
| | Area of Flow Passage ($mm^2$) | | 0.63 | 1.58 | 3.11 | 4.64 |
| | Length of Flow Passage (mm) | | 0.40 | 0.40 | 0.40 | 0.40 |
| | Hydraulic Diameter (m) dh = Dout − Din (Annulus) | | 4.00E−05 | 1.00E−04 | 2.00E−04 | 3.00E−04 |
| | Pressure Loss ($m^3/s$) | | 1.40E+10 | 8.98E+08 | 1.13E+08 | 3.36E+07 |
| Flow Passage 4 | Outer Diameter at the Center (mm) | | 11.80 | 11.80 | 11.80 | 11.80 |
| | Inner Diameter at the Center (mm) | | 11.76 | 11.70 | 11.60 | 11.50 |
| | Average Length (mm) | | 0.40 | 0.40 | 0.40 | 0.40 |
| | Area of Flow Passage ($mm^2$) | | 0.74 | 1.84 | 3.67 | 5.49 |
| | Length of Flow Passage (mm) | | 0.40 | 0.40 | 0.40 | 0.40 |
| | Hydraulic Diameter (m) dh = Dout − Din (Annulus) | | 4.00E−05 | 1.00E−04 | 2.00E−04 | 3.00E−04 |
| | Pressure Loss ($m^3/s$) | | 1.19E+10 | 7.60E+08 | 9.55E+07 | 2.84E+07 |
| Total Pressure Loss ($Pa/(m^3/s)$) | | 5.00E+05 | 4.21E+10 | 2.70E+09 | 3.40E+08 | 1.02E+08 |
| Flow Rate under pressure at 10 kPa (mL/s) | | 20005 | 0.24 | 3.7 | 29 | 98 |
| Flow Rate under pressure at 5 kPa (mL/s) | | 10003 | 0.12 | 1.85 | 15 | 49 |
| Evaluation(Under Pressure): ×1000 mL/s ↑ | | Excess | Appropriate | Appropriate | Appropriate | Appropriate |
| Evaluation(Normal) ×1 mL/s ↓ | | Appropriate | Non-practical | Appropriate | Appropriate | Appropriate |

| | | Straight Clearance (First Embodiment) | | Tapered Clearance (Second Embodiment) |
|---|---|---|---|---|
| | | Example 4 | Comparative Example 3 | Example 5 |
| | Stroke Length (mm) | 1.5 | 1.5 | 1.5 |
| Flow Passage 1 | Outer Diameter at the Center (mm) | 9.87 | 9.87 | 9.87 |
| | Inner Diameter at the Center (mm) | 7.82 | 7.82 | 7.82 |
| | Average Length (mm) | 1.69 | 1.69 | 1.69 |
| | Area of Flow Passage ($mm^2$) | 28.38 | 28.38 | 28.38 |
| | Length of Flow Passage (mm) | 1.69 | 1.89 | 1.69 |
| | Hydraulic Diameter (m) dh = Dout − Din (Annulus) | 2.04E−03 | 2.04E−03 | 2.04E−03 |
| | Pressure Loss ($m^3/s$) | 5.00E+05 | 5.00E+05 | 5.00E+05 |
| Flow Passage 2 | Outer Diameter at the Center (mm) | 8.60 | 8.80 | 8.60 |
| | Inner Diameter at the Center (mm) | 8.20 | 7.60 | 8.40 |
| | Average Length (mm) | 0.40 | 0.40 | 0.40 |
| | Area of Flow Passage ($mm^2$) | 5.28 | 12.72 | 2.67 |
| | Length of Flow Passage (mm) | 0.40 | 0.40 | 0.40 |
| | Hydraulic Diameter (m) dh = Dout − Din (Annulus) | 4.00E−04 | 1.00E−03 | 2.00E−04 |
| | Pressure Loss ($m^3/s$) | 1.66E+07 | 1.10E+06 | 1.30E+08 |
| Flow Passage 3 | Outer Diameter at the Center (mm) | 10.00 | 10.00 | 10.78 |
| | Inner Diameter at the Center (mm) | 9.60 | 9.00 | 10.03 |
| | Average Length (mm) | 0.40 | 0.40 | 0.30 |
| | Area of Flow Passage ($mm^2$) | 6.15 | 14.92 | 12.26 |
| | Length of Flow Passage (mm) | 0.40 | 0.40 | 0.30 |
| | Hydraulic Diameter (m) dh = Dout − Din (Annulus) | 4.00E−04 | 1.00E−03 | 7.50E−04 |
| | Pressure Loss ($m^3/s$) | 1.42E+07 | 9.41E+05 | 1.55E+08 |
| Flow Passage 4 | Outer Diameter at the Center (mm) | 11.80 | 11.80 | 12.91 |
| | Inner Diameter at the Center (mm) | 11.40 | 10.80 | 12.17 |
| | Average Length (mm) | 0.40 | 0.40 | 0.30 |
| | Area of Flow Passage ($mm^2$) | 7.28 | 17.74 | 14.85 |
| | Length of Flow Passage (mm) | 0.40 | 0.40 | 0.30 |
| | Hydraulic Diameter (m) dh = Dout − Din (Annulus) | 4.00E−04 | 1.00E−03 | 7.44E−04 |
| | Pressure Loss ($m^2/s$) | 1.20E+07 | 7.91E+05 | 1.31E+06 |
| Total Pressure Loss ($Pa/(m^3/s)$) | | 4.34E+07 | 3.33E+08 | 1.33E+08 |
| Flow Rate under pressure at 10 kPa (mL/s) | | 230 | 2999 | 75 |
| Flow Rate under pressure at 5 kPa (mL/s) | | 115 | 1600 | 37 |
| Evaluation(Under Pressure): ×1000 mL/s ↑ | | Appropriate | Excess | Appropriate |
| Evaluation(Normal) ×1 mL/s ↓ | | Appropriate | Appropriate | Appropriate |

Each pressure loss in Table 2 of the first flow passage through the fourth flow passage is calculated using Eq. 3, with an example that the amount of pushing-in (valve stroke) of the valve body 6*c* constituting the inner plug 3*b* (valve) is 1.5 mm that is the stroke length when the valve is opened most largely.

In Table 2, the blank case is shown as a Comparative Example 1, the straight clearance case lists the Examples 1 to 4 and Comparative Examples 2 and 3, and the tapered clearance case is shown as the Example 5.

The first flow passage shown in Table 2 is a flow passage formed by the inner plug 3*b* (valve) and the numerical values in each corresponding position are the same in all of the Examples 1 to 5 and the Comparative Examples 1 to 3.

In Comparative Example 1, Examples 1 to 5, and Comparative Example 2 in the straight clearance case, the numerical values of the respective inner diameters at the center in each of the second passage through the fourth flow passage are set to gradually decrease, and the calculated pressure loss corresponding to the inner diameter at the center is shown in an Excel exponential notation. Further, the sum of the pressure loss due to each of the first flow passage through the fourth flow passage is shown as a total pressure loss in an Excel exponential notation.

The inner diameter at the center of the second flow passage corresponds to the diameter D6 shown in FIG. 20B, the inner diameter at the center of the third flow passage corresponds to the diameter D2 shown in FIG. 20A, and the inner diameter at the center of the fourth flow passage corresponds to the diameter D8 shown in FIG. 20B.

In Table 2, the "flow rate under pressure at 10 kPa" and the "flow rate under pressure at 5 kPa" are shown; this means the amount of the application liquid flowing out through the application unit 3 (an average value of n=3 using ethanol) when the container 2 composed of a squeeze bottle is pressurized.

When the outflow amount of the application liquid at 10 kPa pressure exceeds 1000 mL/s, the application liquid is considered to be excessively dispensed (excessive exuding), and "Excess" is written in the "Evaluation (at pressure)" column, and an "Appropriate" is written if the outflow amount is 1000 mL/s or less.

When the outflow amount of the application liquid at 5 kPa pressure is less than 1 mL/s, the dispense is considered too little and out of practical use, and "Non-practical" is given in the "Evaluation (normal)" column, an "Appropriate" is given if the outflow amount is 1 mL/s or more.

When both the "Evaluation (at pressure)" column and "Evaluation (normal)" column are given with "Appropriate", an appropriate pressure loss is given to the liquid flow passages; a preferable applicator is considered to be obtained in which a sudden dispense of application liquid can be prevented under the pressure of 10 kPa and a practically appropriate supply of application liquid can be supplied under the normal condition of 5 kPa.

Although Examples 1 to 5 are considered to satisfy the preferred applicator condition with a reasonable pressure loss to the liquid flow passages as shown in Table 2, the sum of the pressure loss of the liquid flow passages per 1 $m^3$/s in the examples is in the range of 4.34E+07=$4.34\times10^7$ to 2.70E+09=$2.70\times10^9$.

Since the sum of pressure loss for the non-preferred applicator condition is from 5.00E+05=$5.00\times10^5$ to 3.33E+06=$3.33\times10^6$ and 4.21E+10=$4.21\times10^{10}$, it is appropriate to set the sum of pressure loss of flow passages per 1 $m^3$/s to be $1\times10^7$ Pa·s or greater and less than $1\times10^{10}$ Pa·s.

This makes it possible to provide an applicator that can control excessive flow of the application liquid and prevent sudden outflow of the application liquid from the application member, even when the aforementioned ethanol or the like, which has particularly low viscosity and surface tension, is used as the application liquid.

In an applicator equipped with this type of application unit 3 having a liquid flow passage 3*a* whose cross-sectional shape is annulus (annular shape) as described above, the pressure loss per 1 $m^3$/s of the flow passage can be calculated by Eq. 3 based on the viscosity of the contained application liquid.

Therefore, by setting the total pressure loss due to the individual channels in the range of $1\times10^7$ Pa·s or more and less than $1\times10^{10}$ Pa·s, it is possible to obtain an applicator that can prevent sudden liquid flow out of the application member, which can contribute to the design of the flow passages.

REFERENCE SIGNS LIST

1 applicator
2 container
2*c* mouth
3 application unit
3*a* liquid flow passage
3*b* inner plug (valve)
4 cap
5 valve seat member
5*a* valve opening (application liquid outlet)
5*g* second annular protrusion
5*h* first annular protrusion
5*j* annular groove
5*k* valve seat
6 valve body member
6*b* spring member
6*c* valve body
6*d* valve rod
6*e* annular protrusion (third annular protrusion)
6*f* annular groove
6*g* cylinder
7 application member
8 support ring for the application member
11 packaging sheet
11*a* body-side sheet
11*b* cap-side removing sheet

The invention claimed is:

1. An applicator comprising:

a container containing an application liquid;

an inner plug that is disposed to close the mouth of the container and opens a valve against the biasing force of a spring member to allow the application liquid in the container to be discharged; and an application member, which is disposed to cover the application liquid outlet of the inner plug and to enable the application to the application surface by exuding the application liquid discharged through the inner plug, wherein a liquid flow passage from the inside of the container toward the application member imparting flow resistance to the application liquid is formed at the application unit provided with an inner plug and the total pressure loss per 1 $m^3$/s of the liquid flow passage is equal to or more than $1\times10^7$ Pa·s and less than $1\times10^{10}$ Pa·s.

2. The applicator recited in claim 1, wherein the liquid flow passage formed in the application unit includes a first flow passage through a fourth flow passage, which are connected in series;

the first flow passage is a flow passage that is formed between a valve seat of a valve seat member forming the application unit and a valve body of the valve body member facing the valve seat, the second flow passage is a flow passage that is formed between a circumferential side surface of a cylinder connected to the peripheral edge of the valve body of the valve member and an inner circumferential surface of a first annular protrusion formed connected to the peripheral edge of the valve seat, the third flow passage is a flow passage that is formed between the outer circumferential surface of the first annular protrusion and the inner circumferential surface of a third annular protrusion concentrically formed on the outside of the cylinder in the valve body member, and the fourth flow passage is a flow passage that is formed between the outside of the third annular protrusion of the valve body member and the inside of a second annular protrusion concentrically formed outside of the first annular protrusion of the valve seat member.

3. The applicator recited in claim 2, wherein the pressure loss per 1 $m^3/s$ of the respective first flow passage through the fourth flow passage, forming the liquid flow passage, is set to the values obtained by the following Eq. 3:

$$\Delta P/R = 32\ \mu L/Sd^2, \qquad \text{Eq. 3}$$

where ΔP is a pressure loss (Pa), R is a flow rate ($m^3/s$), μ is the viscosity of the application liquid (Pa·s), L is a representative flow passage length (m), S is a cross-sectional area of the representative flow passage ($m^2$), and d is the hydraulic diameter (m).

4. The applicator recited in claim 1, wherein the cross-sectional area of the flow passage of the liquid flow passage varies by the retraction of a valve body member facing a valve seat of a valve seat member constituting the application unit, and the pressure loss of the liquid flow passage becomes minimal when the valve body is most retracted, and the pressure loss per 1 $m^3/s$ in which state is equal to or more than $1\times10^7$ Pa·s and less than $1\times10^{10}$ Pa·s.

* * * * *